United States Patent
Brown et al.

(10) Patent No.: US 11,284,603 B2
(45) Date of Patent: Mar. 29, 2022

(54) SYSTEM AND METHOD FOR DELIVERING NUTRIENTS TO RECENTLY HATCHED CHICKS

(71) Applicants: UNITED ANIMAL HEALTH, INC., Sheridan, IN (US); BLYNDA, LLC, Lake Jackson, TX (US)

(72) Inventors: Blyn Brown, Lake Jackson, TX (US); Trenton S. Torrance, Zionsville, IN (US); Terry Stemler, Sunfield, MI (US); Wade Almy, Portland, MI (US); Britt Leonard, Clarksville, MI (US); Eric Aicher, West Monroe, LA (US)

(73) Assignee: United Animal Health, Inc., Sheridan, IN (US)

( * ) Notice: Subject to any disclaimer, the term of this patent is extended or adjusted under 35 U.S.C. 154(b) by 214 days.

(21) Appl. No.: 16/365,377

(22) Filed: Mar. 26, 2019

(65) Prior Publication Data
US 2019/0387718 A1 Dec. 26, 2019

Related U.S. Application Data

(60) Provisional application No. 62/648,052, filed on Mar. 26, 2018.

(51) Int. Cl.
| | |
|---|---|
| *A01K 39/012* | (2006.01) |
| *A01K 7/02* | (2006.01) |
| *A01K 39/01* | (2006.01) |
| *A01K 45/00* | (2006.01) |
| *A01K 39/04* | (2006.01) |

(52) U.S. Cl.
CPC .............. *A01K 7/02* (2013.01); *A01K 39/01* (2013.01); *A01K 39/012* (2013.01); *A01K 39/04* (2013.01); *A01K 45/00* (2013.01)

(58) Field of Classification Search
CPC ...... A01K 39/00; A01K 39/012; A01K 39/04; A01K 5/02; A01K 5/0216; A01K 5/0233; A01K 5/0275; A01K 5/0283; A01K 7/02; A01K 7/06; A01K 45/00; A01K 39/01; A01K 45/002; A01K 45/007; A61D 7/00; A61D 1/025
See application file for complete search history.

(56) References Cited

U.S. PATENT DOCUMENTS

| | | | |
|---|---|---|---|
| 8,794,185 B2* | 8/2014 | Lee ..................... | A01K 39/01 119/72 |
| 2002/0104485 A1* | 8/2002 | Lewis .................. | A61D 1/025 119/72.5 |
| 2005/0263541 A1* | 12/2005 | Hoff .................... | A01K 5/0283 222/1 |

(Continued)

FOREIGN PATENT DOCUMENTS

| | | | | |
|---|---|---|---|---|
| WO | WO-2013182624 A1 * | 12/2013 | ........... | A01K 39/012 |
| WO | WO-2018165730 A1 * | 9/2018 | ............. | A01K 39/04 |

*Primary Examiner* — Kristen C Hayes
(74) *Attorney, Agent, or Firm* — Barnes & Thornburg LLP

(57) ABSTRACT

An apparatus for delivering digestible products to hatchling fowl includes a controller and a metered delivery mechanism, the metered delivery mechanism electrically coupled to the controller and configured to deliver a pre-defined quantity of digestible products to the container. The digestible product includes an edible and digestible semisolid material.

19 Claims, 24 Drawing Sheets

(56) References Cited

U.S. PATENT DOCUMENTS

| | | | |
|---|---|---|---|
| 2008/0035241 A1* | 2/2008 | Wittbold | B67D 3/0077 141/361 |
| 2008/0190373 A1* | 8/2008 | Lee | A61K 47/36 119/72 |
| 2017/0209250 A1* | 7/2017 | Palmer | A01K 45/00 |

* cited by examiner

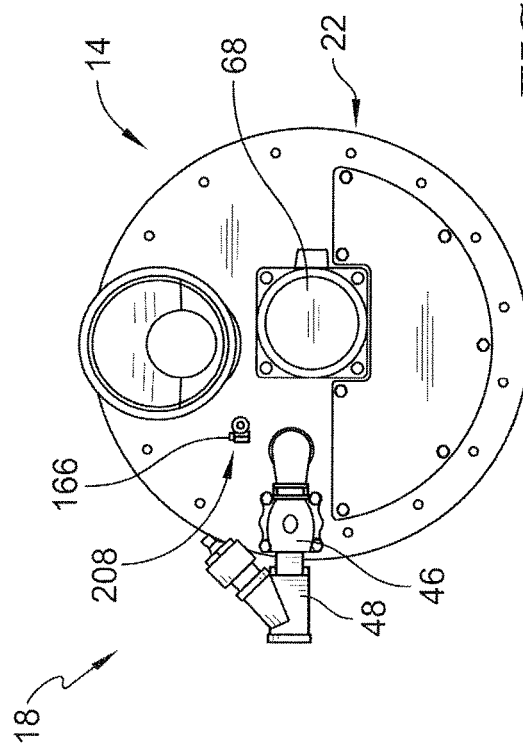
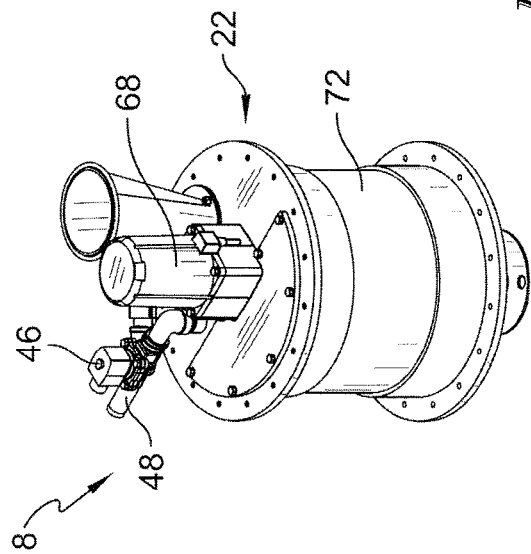
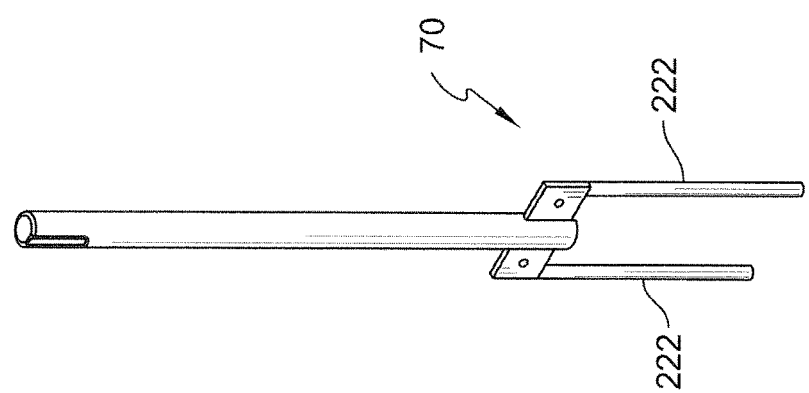
FIG. 10
FIG. 11
FIG. 12

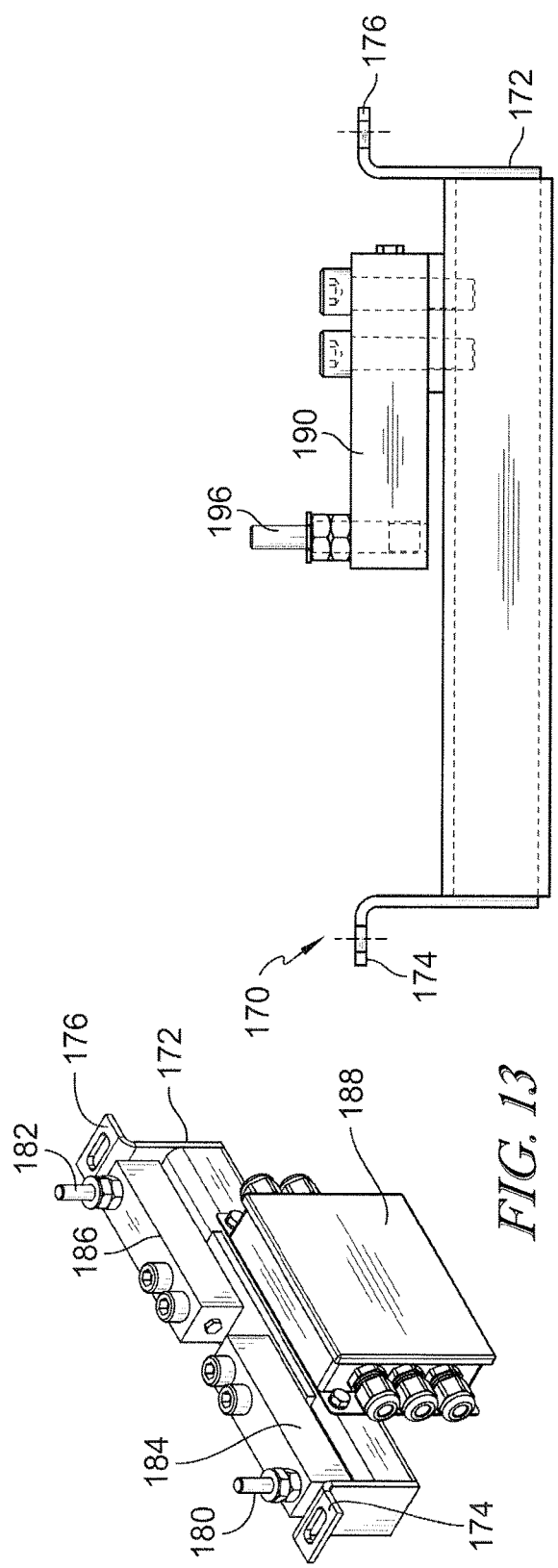
FIG. 14
FIG. 13
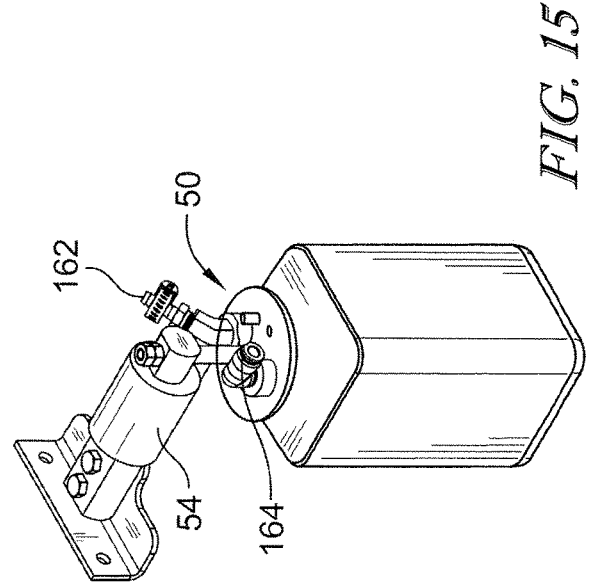
FIG. 15

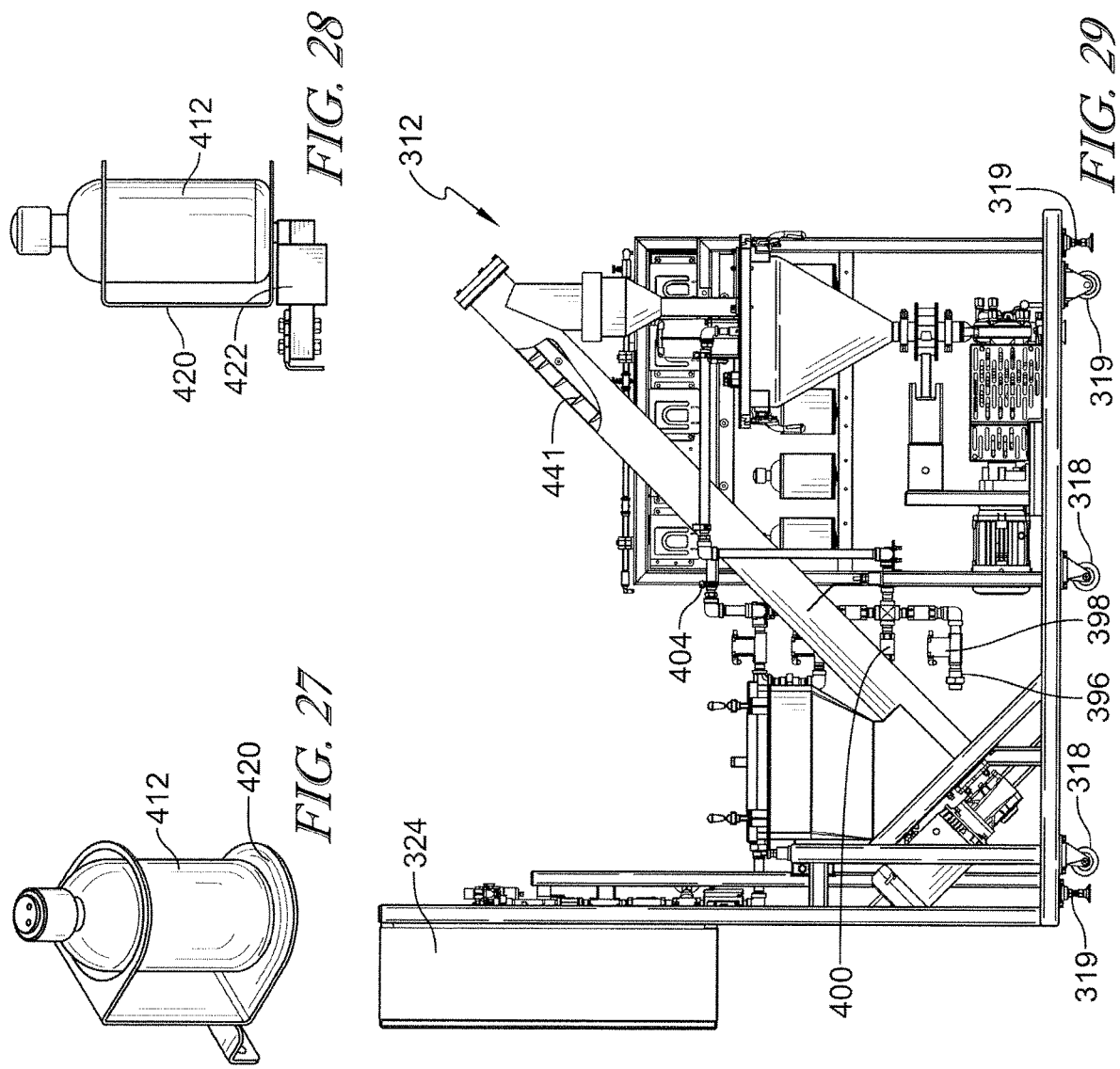

SYSTEM AND METHOD FOR DELIVERING NUTRIENTS TO RECENTLY HATCHED CHICKS

CROSS REFERENCE TO RELATED APPLICATIONS

This application claims priority under 35 U.S.C. § 119(e) to U.S. Provisional Application Ser. No. 62/648,052 filed on Mar. 26, 2018, the entire disclosure of which is incorporated herein by reference.

TECHNICAL FIELD

The present disclosure is related to an automated system for delivering nutrients to recently hatched chicks. More specifically, the present disclosure is related to the automated delivery of a digestible nutrient material to a container containing a number of recently hatched chicks as the container moves through a processing facility for preparing the chicks for transport to a growing facility.

BACKGROUND

Recently hatched chicks must be hydrated, fed, and immunized. There are many challenges to feeding and watering chicks as they are processed in the hours after hatching. The difficulty in accurately delivering the appropriate nutrients should be easily understood as the new chicks are relatively fragile organisms and easily susceptible to injury. In addition, delivering the food to the chicks can impede the productivity of the hatchery due to high levels of labor required.

With regard to medicating the chicks, it is known to apply vaccines by injection at the time of sorting of the hatchlings for brooding and/or transport. It is also known to apply aqueous live vaccines in a sprayed on feed or by adding the vaccine to a drinking water.

Vaccines are also sometimes applied through the use of a spray cabinet. A spray cabinet is utilized in a hatchery to spray the chicks with a liquid form of the vaccine. A container of chicks having about 100 birds is placed in the cabinet and material is sprayed directly on the chicks. As the birds preen they ingest the vaccine from their feathers.

There have been several approaches to making feed products available to hatchling chicks, but most are labor intensive. For example applying a strip of feed in an area where hatchlings are located requires placement without injuring the chicks. This generally requires extra handling to effect the feeding process.

Clearly, providing nutrients, hydration, and vaccinations early in the chicks' lives will improve the viability of the chicks. Thus, a system which solves the problems of excessive handling and labor, potential injury to chicks, and inadequate consumption of the nutrient products by the chicks would have significant commercial value.

SUMMARY

The present disclosure includes one or more of the features recited in the appended claims and/or the following features which, alone or in any combination, may comprise patentable subject matter.

According to a first aspect of the present disclosure, an apparatus for delivering digestible products to hatchling fowl includes a controller, a receiving portion for receiving a container of hatchling fowl, a sensor electrically coupled to the controller and operable to detect that the container is within the receiving portion, and a metered delivery mechanism. The metered delivery mechanism is electrically coupled to the controller and configured to deliver a pre-defined quantity of digestible product to the container. The controller includes a processor and a memory device, the memory device including instructions that, when executed by the processor, cause the processor to monitor the sensor for the presence of a container, and, when a container is present, activate the metered delivery mechanism to deliver the pre-defined quantity of digestible products to the container.

In some embodiments, the apparatus further includes a grip including an actuator, the grip electrically coupled to the controller and configured to secure the container in a delivery position. The controller is operable to activate the actuator of the grip to secure the container in the delivery position, and, when the container is secured, deliver the digestible products. The controller is also operable deactivate the grip when the digestible products have been delivered to thereby allow the container to move out of the receiving portion.

In some embodiments, the controller is operable to monitor the number of containers processed and keep a record of the number of deliveries of pre-defined quantities of digestible product that have been delivered.

In some embodiments, the apparatus further comprises a mixer operable to mix a plurality of constituents together to form the digestible product.

In some embodiments, the apparatus further comprises a dry material holding bin and a feeder.

In some embodiments, the memory device includes instructions that, when executed by the processor, cause the apparatus to mix a batch of digestible products and transfer the batch to a holding bin for feeding the metered delivery device.

In some embodiments, the apparatus includes a mixer under the control of the controller, the mixer operable to vary a speed and duration of a mixing cycle to varying the characteristics of the digestible products.

In some embodiments, the apparatus further includes a bulk powder delivery unit operable to deliver a variable amount of bulk powder to the mixer as determined by the controller.

In some embodiments, the apparatus further includes a water delivery unit operable to deliver a variable amount of water the mixer as determined by the controller.

In some embodiments, the apparatus further includes a vaccine delivery assembly operable to deliver a variable amount of a pre-mixed liquid material to the mixer.

In some embodiments, the water delivery unit measures the amount of water delivered using a flow meter and the controller is operable to receive a signal from the flow meter.

In some embodiments, the water delivery unit includes a valve and the controller is operable to cause the valve to open and close to control the flow of water into the mixer.

In some embodiments, the vaccine delivery assembly is operable to deliver a flow of fluid from to the flow of water from the water delivery unit.

In some embodiments, the vaccine delivery assembly includes a valve and the controller is operable to cause the valve to open and close to control the flow of liquid from the vaccine delivery assembly.

In some embodiments, the vaccine delivery assembly includes a load cell coupled to the controller, and the controller is operable to monitor the signal from the load cell to determine the amount of fluid delivered to the mixer.

In some embodiments, the bulk powder delivery unit further includes a scale assembly operable to measure the weight of the bulk powder stored in the bulk powder delivery unit.

In some embodiments, the controller is operable to monitor the weight measured by the scale assembly of the bulk powder delivery unit to control the amount of bulk powder delivered to the mixer.

In some embodiments, the controller is operable to vary the amount of digestible product delivered by the metered delivery mechanism.

In some embodiments, the digestible product includes an edible and digestible semisolid material.

In some embodiments, the digestible product includes a gelatin-based gel

In some embodiments, the digestible product includes a silica gel.

In some embodiments, the digestible product includes a cellulose-based gel.

In some embodiments, the digestible product includes a dextrose-based gel.

In some embodiments, the digestible product includes amino acid additives.

In some embodiments, the digestible product includes medicament additives.

In some embodiments, the digestible product is configured to form a structure having a height and a diameter and the height is approximately one-fourth of the diameter.

In some embodiments, the container has a solid bottom.

In some embodiments, the controller includes a touch-screen user interface.

In some embodiments, the apparatus further includes a water delivery unit operable to deliver a variable amount of water the mixer as determined by the controller.

In some embodiments, the apparatus includes a thermostatic mixing valve for controlling the temperature of the water fed to the mixer.

In some embodiments, the apparatus further includes at least one inlet for adding a cleaning agent to the flow of water fed to the mixer.

According to another aspect of the present disclosure, an apparatus for delivering digestible product to hatchling fowl includes a controller, a batching unit, and a dispensing unit. The batching unit includes a mixer for mixing constituents of the digestible product to form a gel. The dispensing unit receives the gel from the batching unit. The dispensing unit includes a receiving portion for receiving a container of hatchling fowl, a sensor electrically coupled to the controller and operable to detect that the container is within the receiving portion, and a metered delivery mechanism, the metered delivery mechanism electrically coupled to the controller and configured to deliver a pre-defined quantity of digestible product to the container. The controller includes a processor and a memory device, the memory device including instructions that, when executed by the processor, cause the processor to monitor the sensor for the presence of a container, and, when a container is present, activate the metered delivery mechanism to deliver the pre-defined quantity of digestible products to the container.

In some embodiments, the batching unit includes a dry powder delivery system and a mixer, the memory device including instructions that, when executed by the processor, cause the dry powder delivery system to deliver a predefined quantity of dry powder to the mixer.

In some embodiments, the batching unit receives water from an externa water source, the flow of water measured by a flow meter of the batching unit and controlled by a valve, and the memory device including instructions that, when executed by the processor, cause the processor to control the flow of water through the valve, measure the flow of water, and operate the valve to deliver a pre-defined quantity of water to the mixer.

In some embodiments, the batching unit includes a vaccine delivery assembly and the memory device includes instructions that, when executed by the processor, cause the processor to control the vaccine delivery assembly to deliver a pre-defined quantity of vaccine to the mixer.

In some embodiments, the mixer includes a drive motor and a mixing paddle driven by the drive motor, and the memory device includes instructions that, when executed by the processor, cause the processor to control the operation of motor to drive the mixing paddle to mix the powder, water, and vaccine to form a gel.

In some embodiments, the batching unit includes a pump driven by a pump motor, the pump moving gel from the batching unit to the delivery unit, the memory device includes instructions that, when executed by the processor, cause the processor to control the operation of the pump motor to move a batch of gel from the mixer to the delivery unit.

In some embodiments, the delivery unit includes an actuable stop, the memory device includes instructions that, when executed by the processor, cause the processor to control the operation of the actuable stop to stop movement of the container relative to the delivery unit until the pre-defined quantity of digestible products is delivered to the container, and then control the operation of the actuable stop to release the container for movement relative to the delivery unit.

According to a third aspect of the present disclosure, method of feeding hatchling fowl includes in a batching unit the steps of (i) automatically delivering a pre-determined quantity of a powder mixture into a mixer by automatically measuring the amount of powder mixture delivered to the mixer as it is delivered until the pre-determined quantity is delivered, the powder mixture including nutritional digestible products, (ii) automatically delivering a pre-determined quantity of water into the mixer by automatically measuring the amount of water delivered to the mixer as it is delivered until the pre-determined quantity is delivered, (iii) operating the mixer the mixer for a predetermined period and at a pre-determined speed to form a gel to complete a batching cycle, and (iv) transferring the gel from the batching unit to a delivery unit. The method also includes, in the delivery unit the steps of (i) sensing the entry of a container of hatchling fowl into the delivery unit, (ii) securing the container of hatchling fowl in the delivery unit, (iii) automatically delivering a predetermined quantity of gel to the container of hatchling fowl, and (iv) releasing the container of hatchling fowl from the delivery unit to complete a delivery cycle.

In some embodiments, the step of measuring the amount of powder mixture includes measuring a weight of powder mixture.

In some embodiments, measuring the amount of water includes measuring a volume of water.

In some embodiments, the method further includes the step of, in the batching unit (v) automatically delivering a medicament to the mixer prior to operating the mixer.

In some embodiments, the method further includes the step of, in the delivery unit, counting the number of delivery cycles completed.

In some embodiments, the method further includes the steps of, in the delivery unit, determining that the number of delivery cycles has depleted a predetermined amount of gel, and in response to the predetermined amount of gel being depleted, in the batching unit, cause an additional batch cycle to be completed.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which:

FIG. 10 is a perspective view of a paddle assembly of the mixer of FIG. 9;

FIG. 11 is a top plan view of the mixer of FIG. 9;

FIG. 12 is a perspective view of the mixer of FIG. 9;

FIG. 13 is a perspective view of a load cell assembly used to support one end of a bulk powder bin of the apparatus of FIG. 1 to measure the weight of the material in the bin;

FIG. 14 is a plan view of a load cell assembly used to support another end of the bulk powder bin of the apparatus of FIG. 1, the load cell assembly of FIG. 14 cooperating with the load cell assembly of FIG. 13 to weigh the material in the bin;

FIG. 15 is a perspective view of a vaccine delivery assembly of the apparatus of FIG. 1 showing a single ended load beam supporting a container so that the weight of the material in the container can be sensed;

FIG. 27 is a perspective view of a vaccine delivery unit of the batching unit of FIG. 21;

FIG. 28 is a side plan view of the vaccine delivery unit of FIG. 27;

FIG. 29 is a side plan view of the batching unit of FIG. 21;

DETAILED DESCRIPTION

The present disclosure is directed to an apparatus 10 and method for delivering a digestible product to a container that contains a number of recently hatched fowl. In the disclosed embodiment, the hatchling fowl includes chicken chicks. In this disclosure, the terms chick and hatchling illustratively refer to the newly hatched chicken offspring that have recently hatched and are being prepared to be transferred to a grower facility. It should be understood that the process could be applied to other hatchling fowl, such as duck, goose, or turkey, for example.

Figure 17:
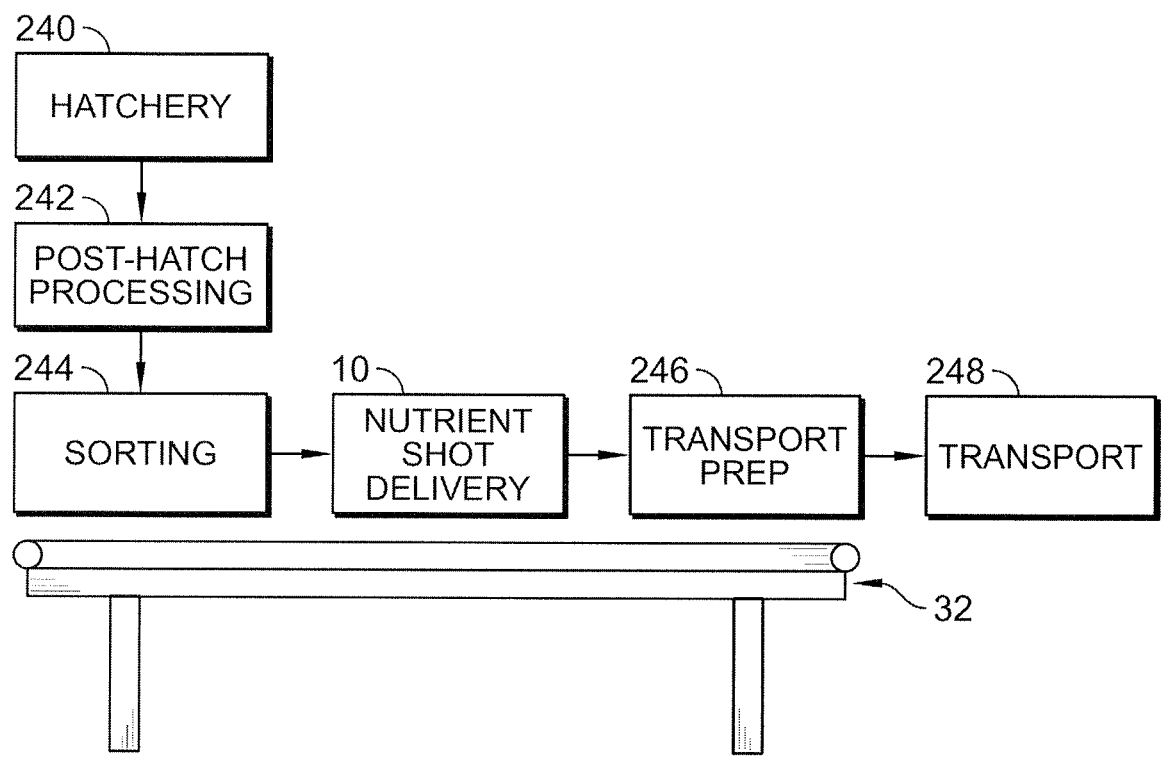
FIG. 17 is a diagrammatic representation of the use of the apparatus of FIG. 1 in a conveyor assembly for transferring hatchling chicks through a post-hatch processing facility.

The present disclosure is directed to a step of the post hatch chick processing as illustrated by the flow chart in FIG. 17, where chicks move from a hatchery 240 to a post-hatch processing area 242 where the chicks may be processed, such as de-beaking or de-clawing. The chicks are then transferred to a sorting and gathering process 244 where chicks that are ready to be advanced are accumulated into containers to be further processed. The containers are then moved along a conveyor 32 past the apparatus 10 wherein a nutrient shot, which will be discussed in further detail below, is delivered to the container. The containers are then transferred to a transport prep step 246 where containers are accumulated and prepared for transportation to a growing facility. At step 248, the chicks are transported to the growing facility, usually several miles away from the hatchery.

Figure 20:
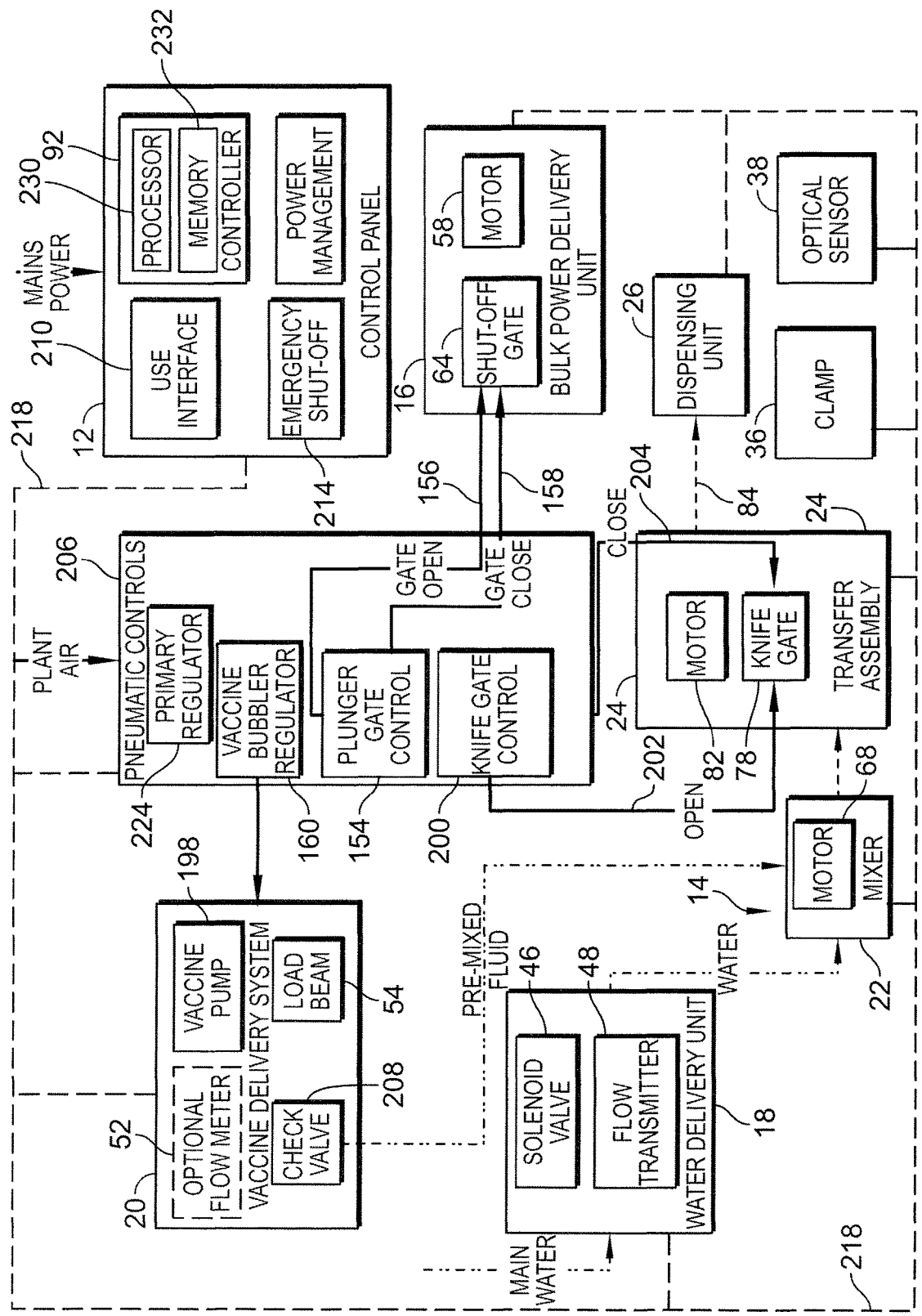
FIG. 20 is a diagrammatic representation of the control system of the apparatus of FIG. 1.

In one embodiment, an apparatus 10 for preparing and delivering the digestible product/nutrient shot is shown in FIGS. 1-5 with the various control components of the system shown diagrammatically in FIG. 20. The apparatus 10 includes a control panel 12 that houses a controller 92 (shown diagrammatically in FIG. 20) which provides the master control of the control system architecture for the apparatus 10 and provides the logic necessary to operate the apparatus 10 in an automatic mode so that the apparatus 10 can automatically deliver the digestible product to a container (see FIG. 18) full of chicks in the course of regular processing in a hatchery facility, as will be described relative to FIG. 17 in further detail below. The apparatus 10 includes several subsystems, including a bulk powder delivery unit 16, a water delivery unit 18, and a vaccine delivery assembly 20, which each feed a mixer 22 of a mixer assembly 14 where water, bulk powder, and vaccines are mixed together to form the digestible product. The apparatus also includes a transfer assembly 24 that transfers the digestible product from the mixer 22 to a dispensing unit 26, where the digestible product is delivered to a container of hatchlings moving along on a conveyor 32 (shown in FIG. 17). The dispensing unit 26 is illustratively a Model B-350E vertical dispenser available from All Fill, Inc., 418 Creamery Way, Exton, Pa. 19341. The apparatus 10 is arranged so that the dispensing unit 26 operates under the control of the controller 92.

Figure 7:
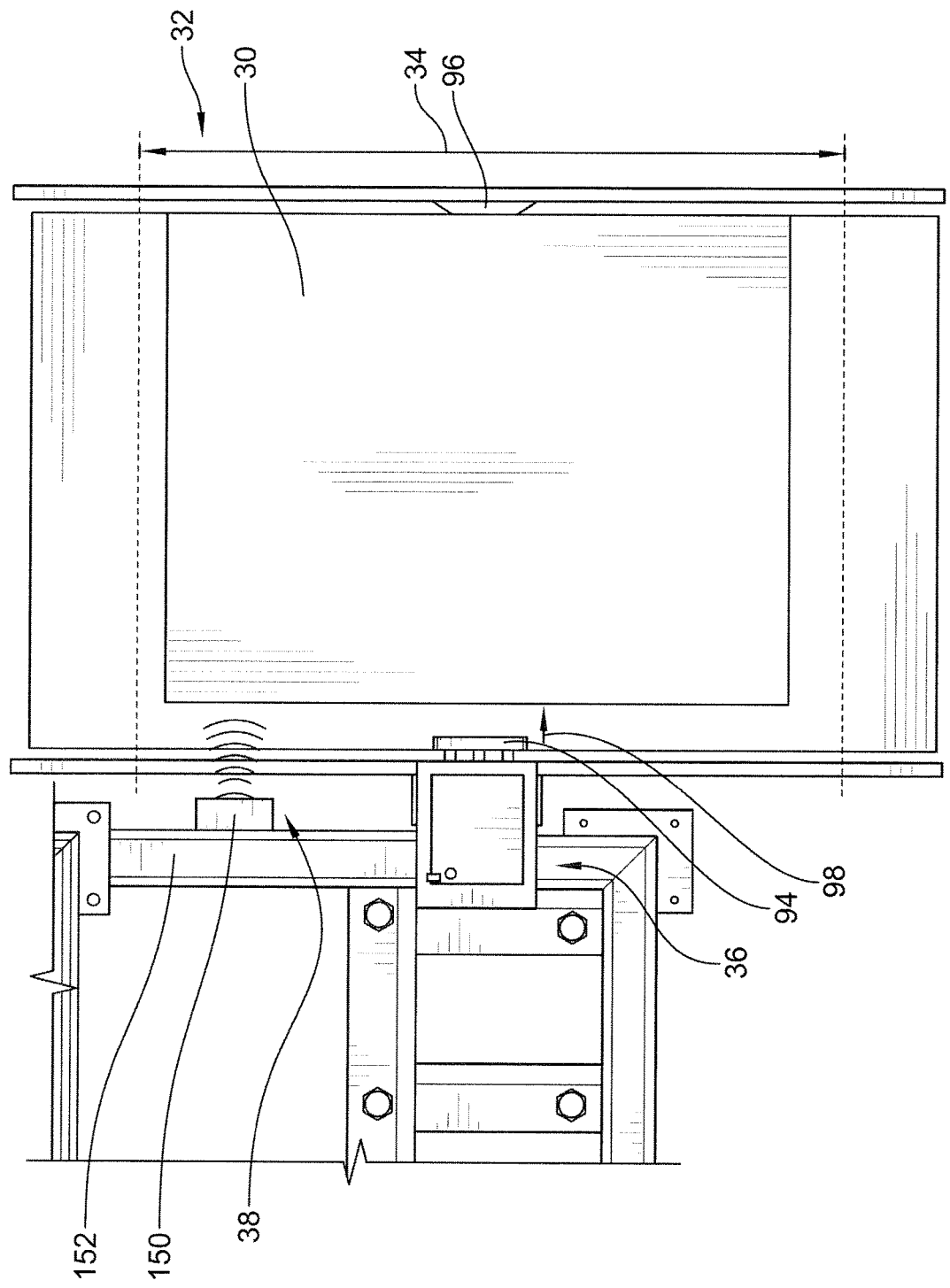
FIG. 7 is a top plan view of a portion of the apparatus of FIG. 1 interacting with a conveyor system to secure a container in a position suitable for the digestible nutrient shot to be delivered to a container.

The dispensing unit 26 cooperates with a dwell clamp 36 (shown in FIG. 7) which secures a hatchling container 30 (also referred to as a chick box 30 or box 30) in a dwell zone 34 so that the container 30 is maintained in a fixed relationship to the dispensing unit 26 while the dispensing unit 26 dispenses a predetermined quantity of digestible product to the container 30. In operation, the dwell clamp 36 extends a grip 94 which urges the container 30 against a clamp block 96 as indicate by arrow 98 in FIG. 7. The dwell clamp 36 is activated by the controller 92 when the controller 92 receives a signal from an optical sensor 38 indicating that a container 30 is present in the dwell zone 34. The optical sensor 38 is housed in a housing 150 which is mounted to a frame 152 of the apparatus 10. Similarly, the dwell clamp 36 is also mounted to the frame 152. In some instances, the predetermined quantity of digestible product is referred to as a "nutrient shot" and includes a nutrient mixture and, in some embodiments may optionally include a vaccine.

In one embodiment, the digestible product described herein can be any edible and digestible semisolid material, including, for example, a gel such as a gelatin-based gel, a silica gel, a cellulose-based gel, a dextrose-based gel, or any other suitable gel material that is a semisolid material and that is edible and digestible. In one illustrative embodiment, the digestible product can have various the formulations as described in this patent application.

In one aspect, the digestible product described herein can contain one or more nutrients or medicaments for agricultural animals. In various illustrative embodiments, optional ingredients that can be included in the digestible product may include, but are not limited to, sugars and complex carbohydrates such as both water-soluble and water-insoluble monosaccharides, disaccharides, and polysaccharides. Other optional ingredients include, but are not limited to, phosphorous, sodium bicarbonate, phytate, calcium, sodium, sulfur, magnesium, potassium, copper, iron, manganese, zinc, and antioxidants. In one embodiment, minerals may be added to the digestible product in the form of a mineral premix.

In other illustrative embodiments, amino acid ingredients may be added to the digestible product including, but not limited to, arginine, histidine, isoleucine, leucine, lysine, cysteine, methionine, phenylalanine, threonine, tryptophan, valine, tyrosine ethyl HCl, alanine, aspartic acid, sodium glutamate, glycine, proline, serine, cysteine ethyl HCl, and analogs, and salts thereof. In yet other embodiments, vitamins may be added including, but not limited to, thiamine, riboflavin, pyridoxine, niacin, niacinamide, inositol, choline chloride, calcium pantothenate, biotin, folic acid, ascorbic acid, and vitamins A, B (e.g., vitamins B6 and B12), K (e.g., vitamin K3), D (e.g., vitamin D3), E, and the like. In another embodiment, vitamins may be added in the form of a vitamin premix.

In another illustrative aspect, any medicament ingredients known in the art may be added to the digestible product, such as antibiotics. In various embodiments, the antibiotic can be selected from the group consisting of ampicillin, chloramphenicol, ciprofloxacin, clindamycin, tetracycline, chlortetracycline, Denagard™, BMD™, Carbadox™, Stafac™, erythromycin, levofloxacin, trimethoprim/sulfamethoxazole, trimethoprim, daptomycin, rifampicin, Tylan™, Pulmotil™, vancomycin, and combinations thereof. In another embodiment, the digestible product may lack antibiotics.

In still other embodiments, the digestible product described herein can also contain one or more direct-fed microbial strains, including, but not limited to, Bacillus strains or Lactobacillus strains. Exemplary direct-fed microbial strains include Bacillus strains 86, 300, 101, 102, 177, and 235, described in U.S. Appl. Publication No. U.S. 2017/0079308 and U.S. Appl. Publication No. U.S. 2017/0246224, each incorporated herein by reference for the disclosure of direct-fed microbial strains.

Figure 1:
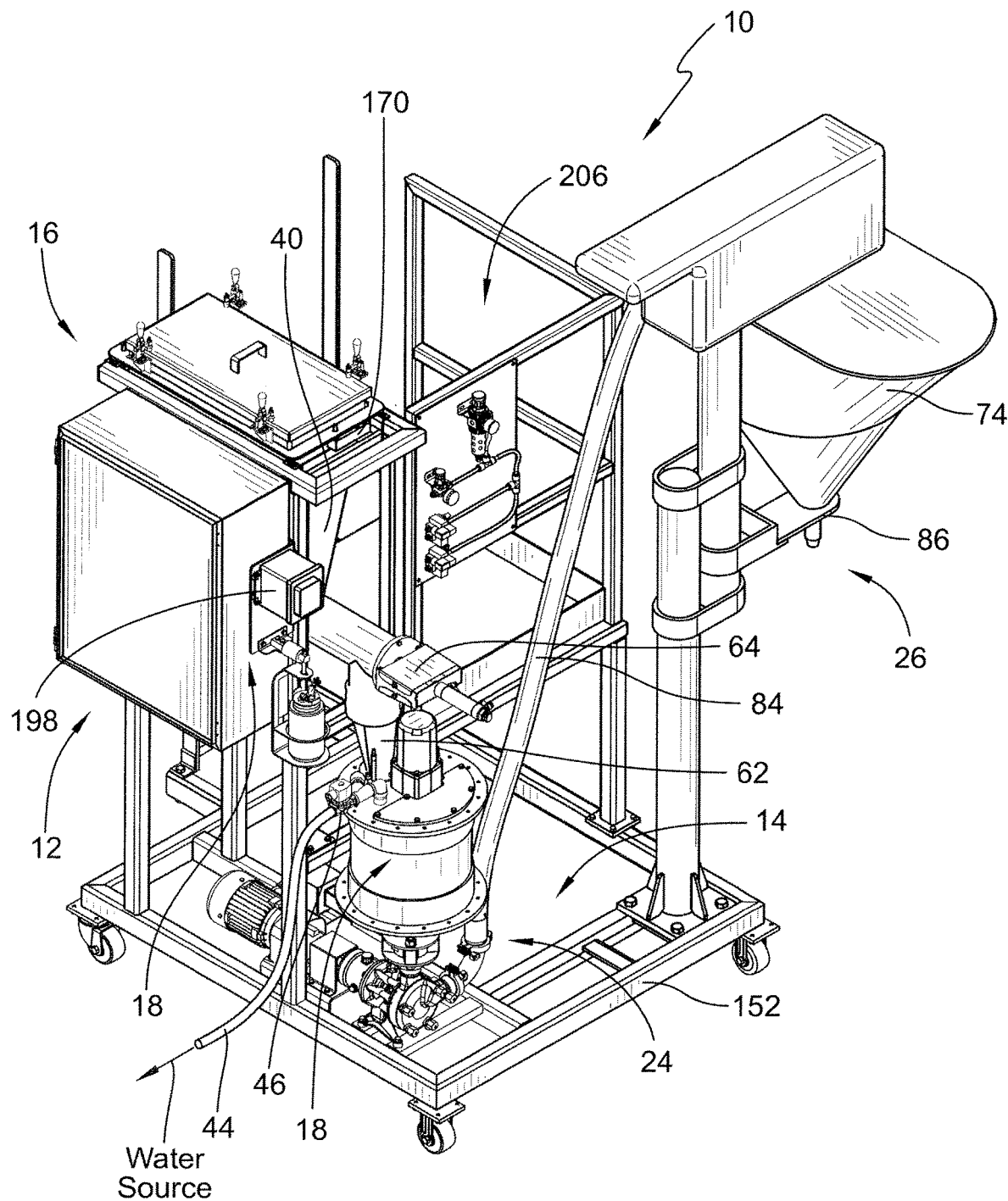
FIG. 1 is a perspective view of an apparatus for automatically delivering an digestible nutrient shot to a container of recently hatched fowl, the view of FIG. 1 taken with the front control panel positioned on the left side of the view of FIG. 1.
Figure 2:
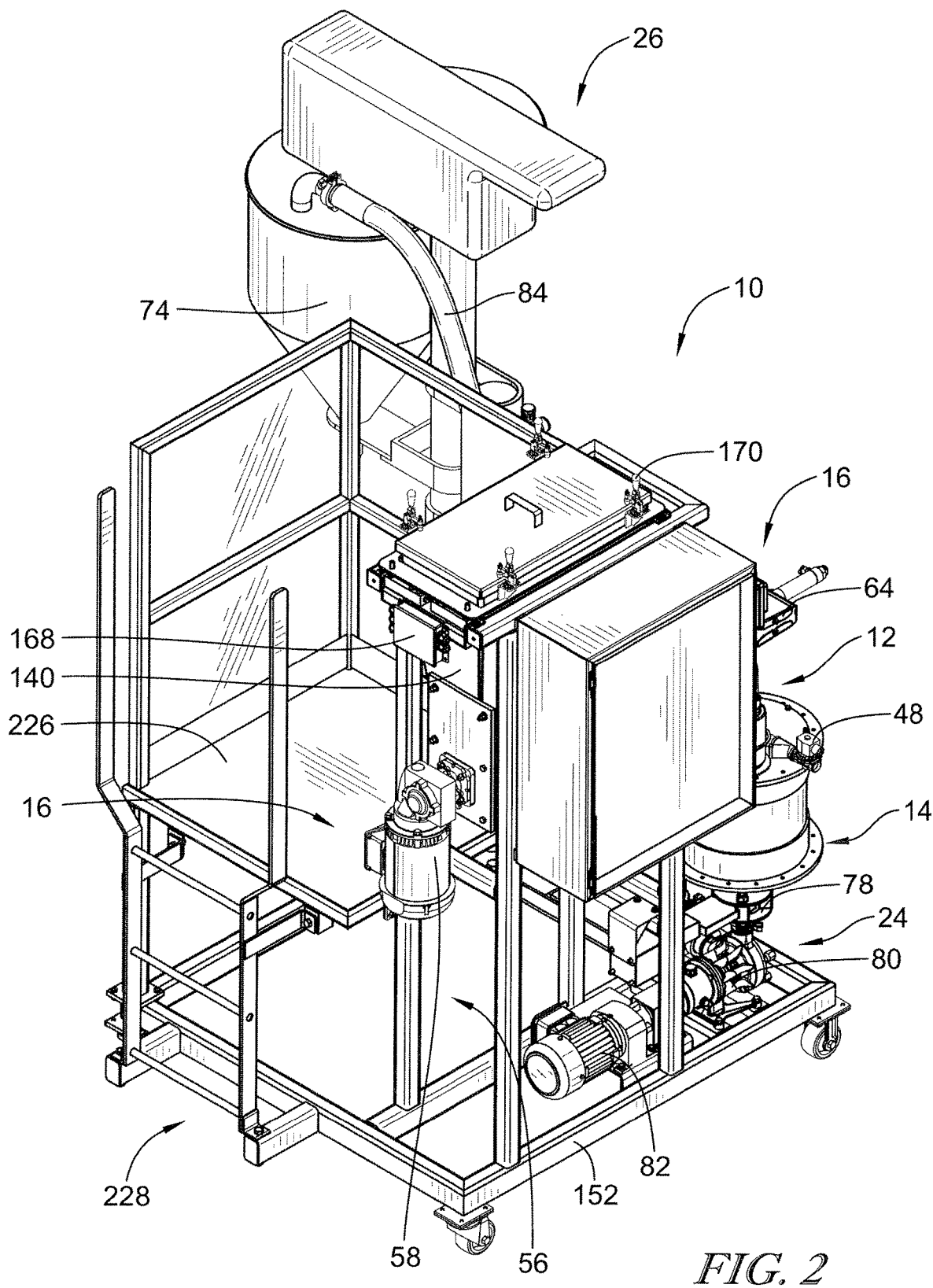
FIG. 2 is a perspective view of the apparatus of FIG. 1, the view of FIG. 2 taken with the front control panel positioned on the right side of the view of FIG. 2.
Figure 3:
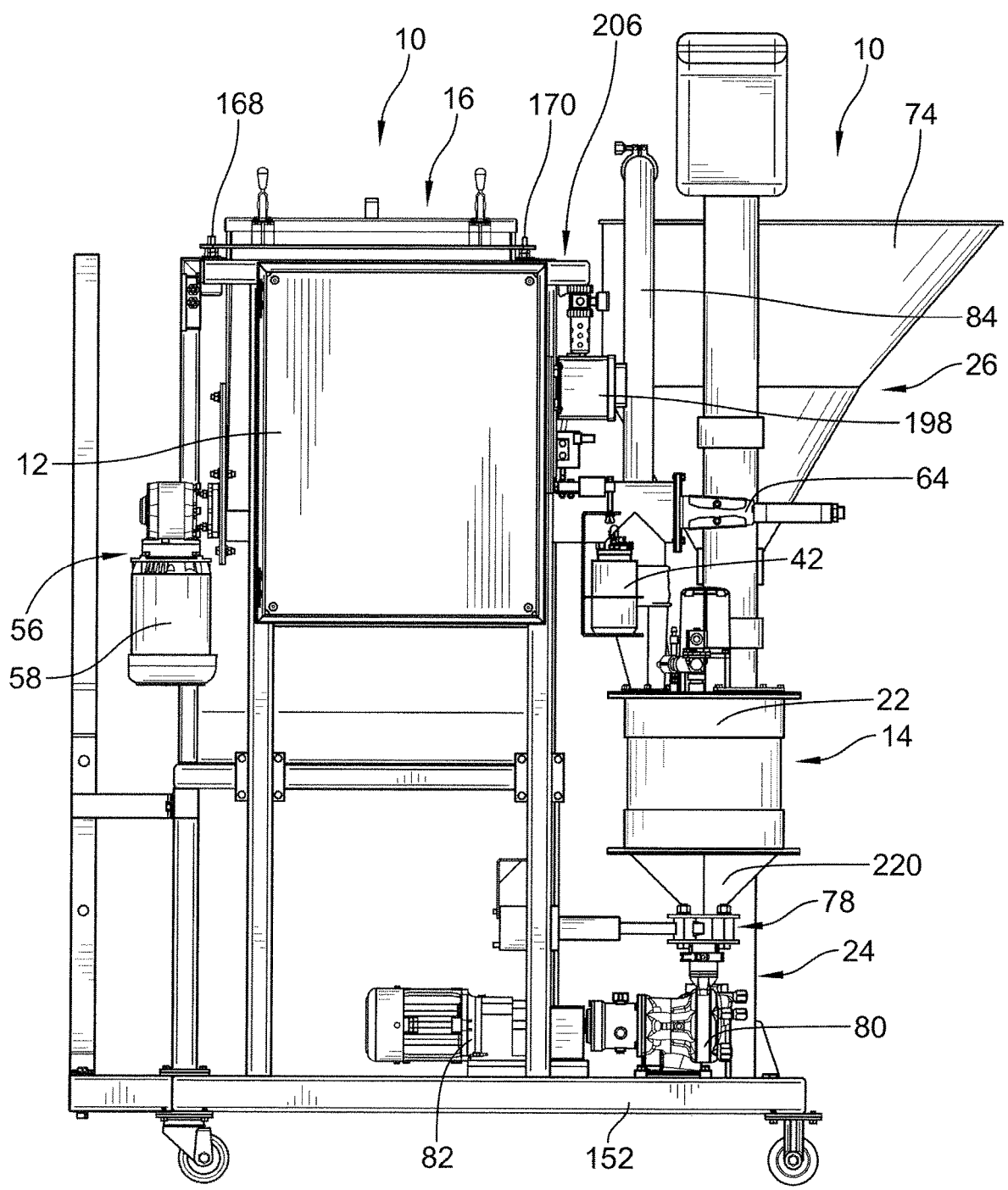
FIG. 3 is a front plan view of the apparatus of FIG. 1.
Figure 4:
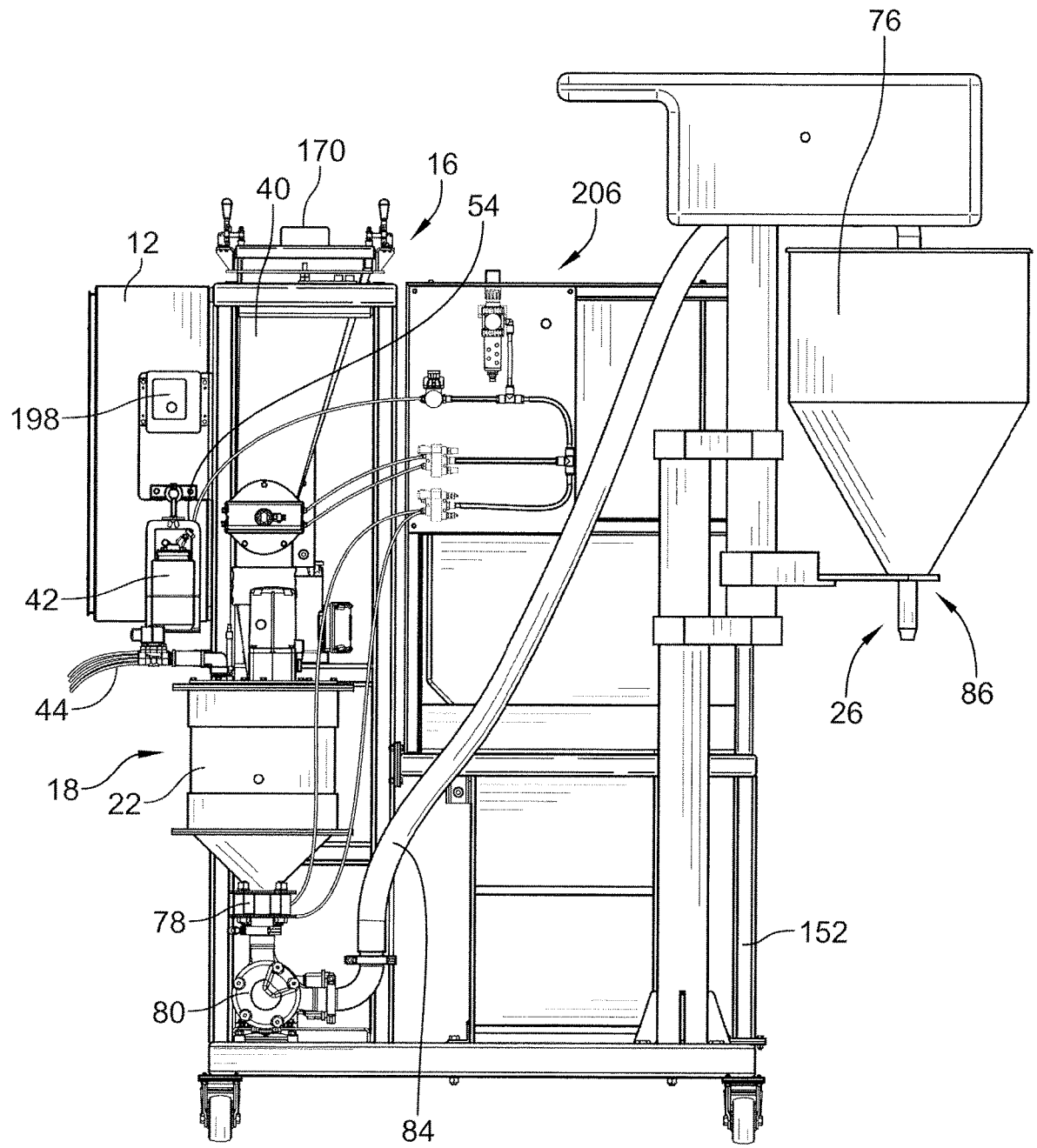
FIG. 4 is a plan view of the right side of the apparatus of FIG. 1.
Figure 5:
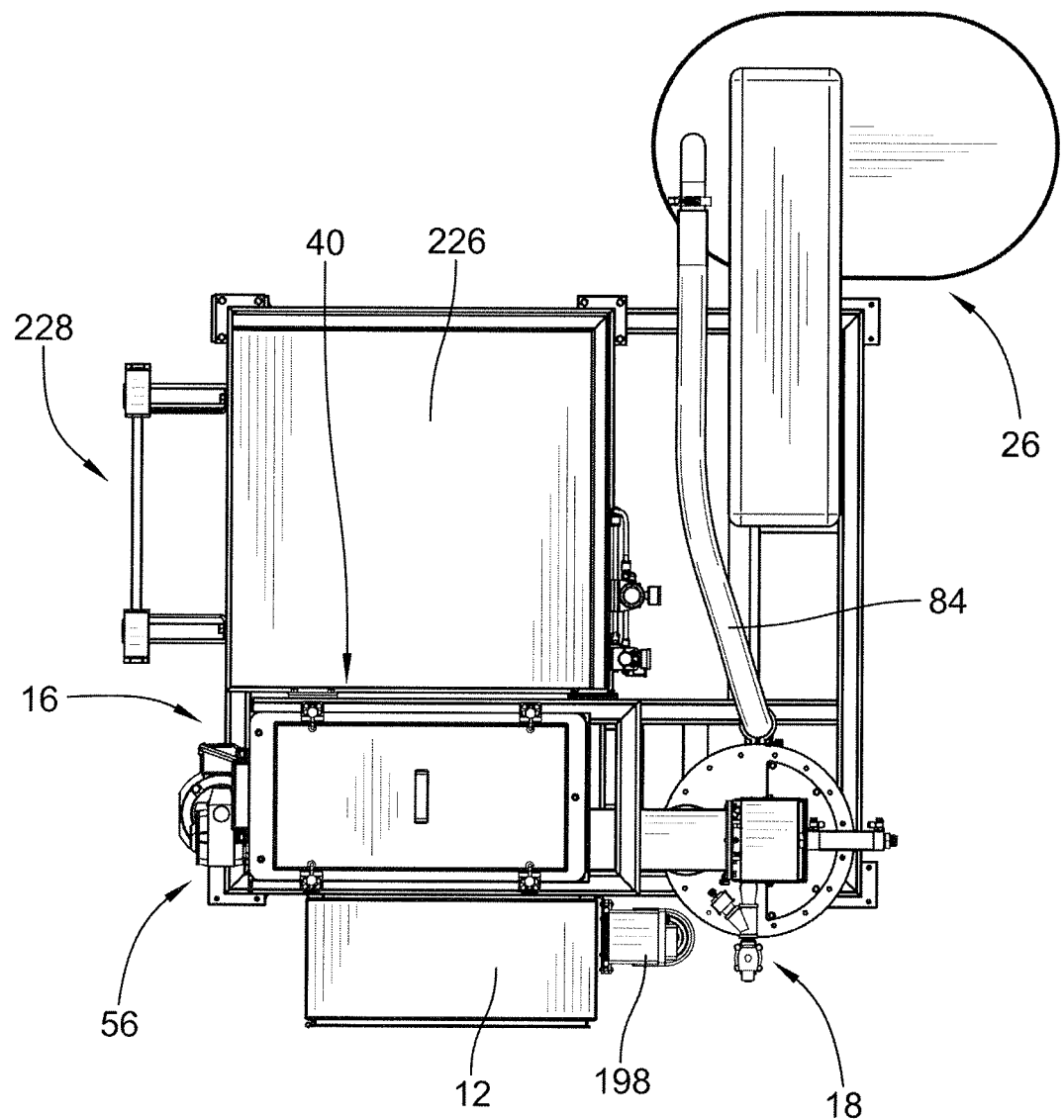
FIG. 5 is a top plan view of the apparatus of FIG. 1.
Figure 6:
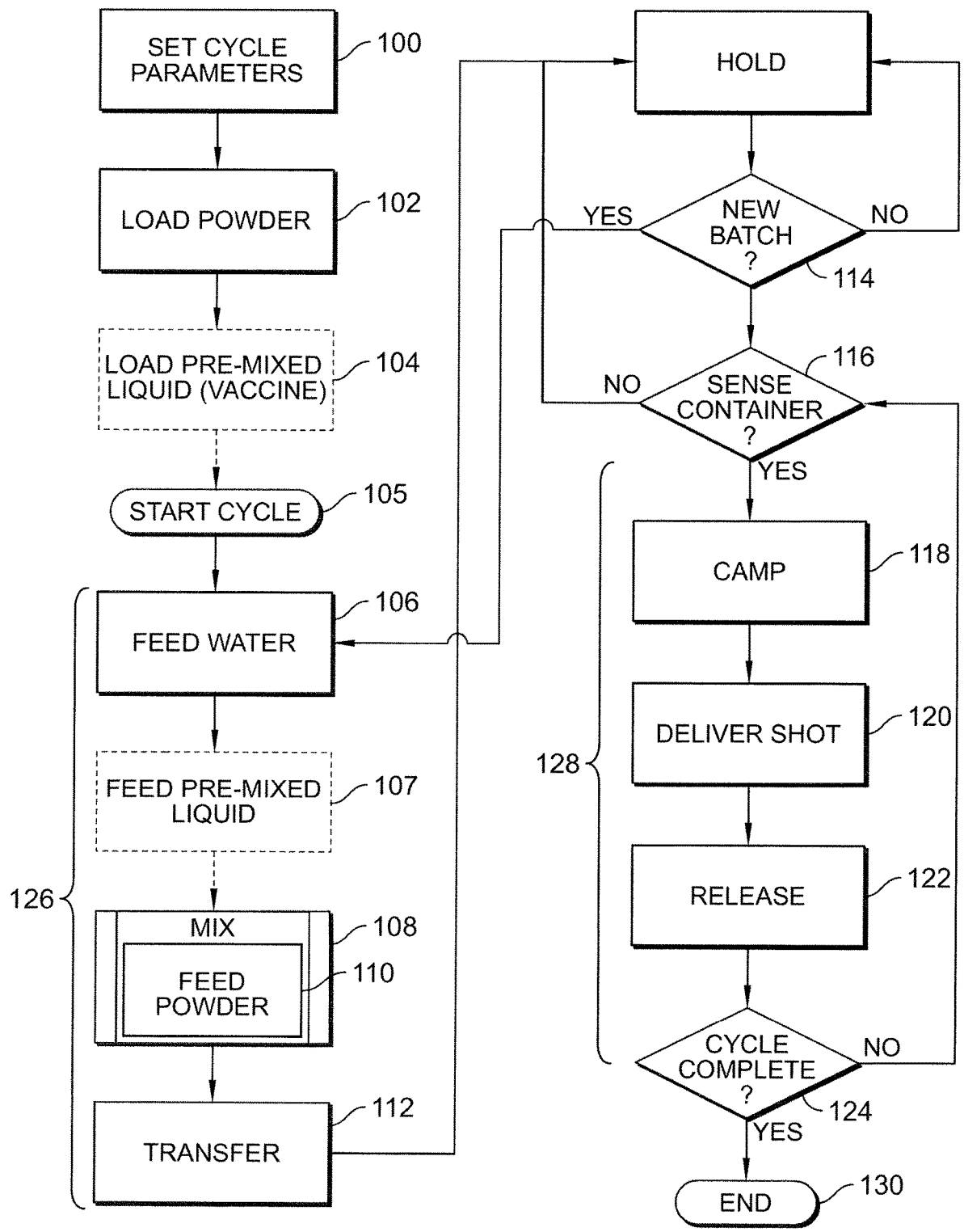
FIG. 6 is a flow chart of the operation of the apparatus of FIG. 1.
Figure 8:
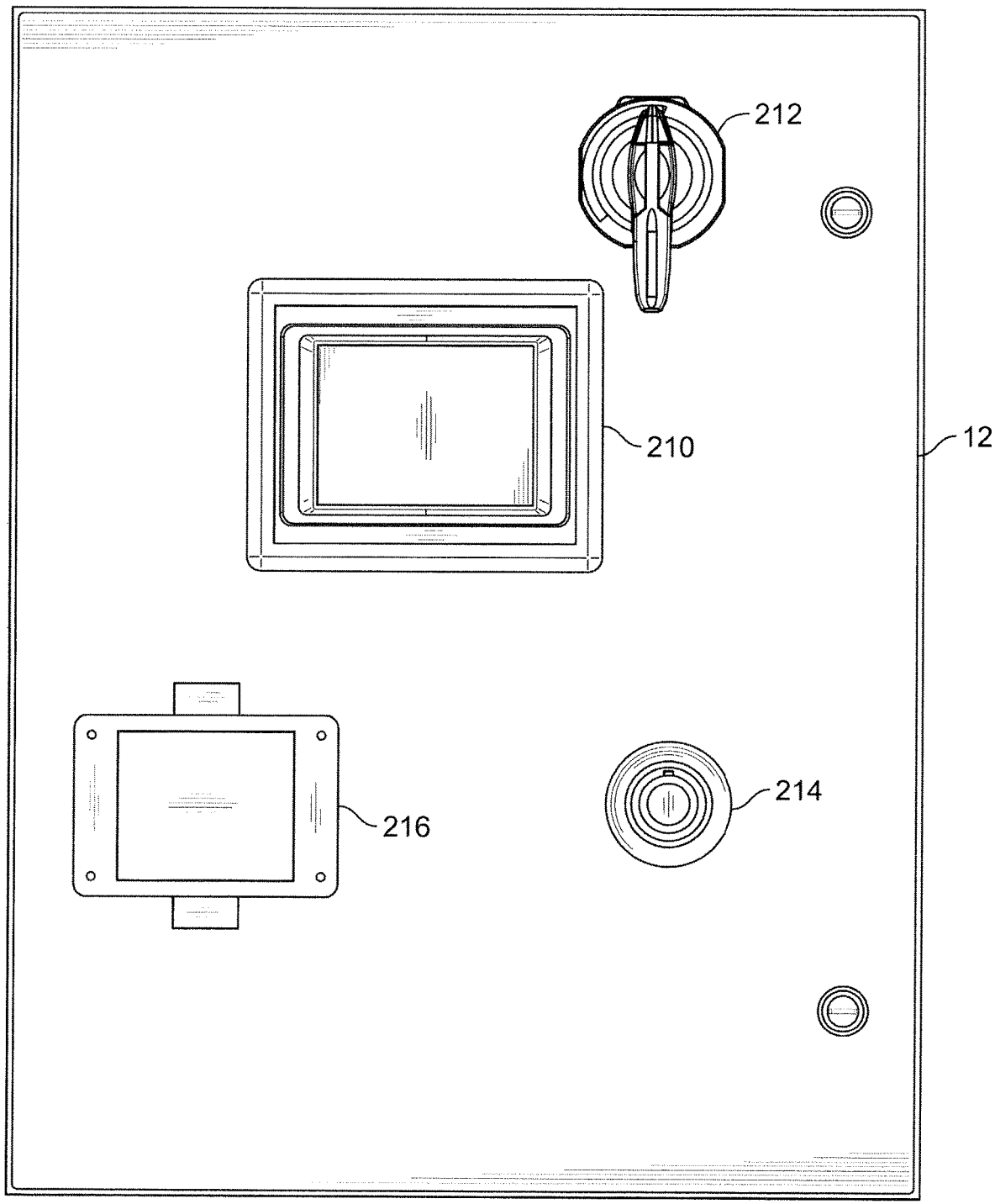
FIG. 8 is a front plan view of a control panel for the apparatus of FIG. 1.

The method of operation of the apparatus 10 can best be understood with reference to a process diagram shown at FIG. 6. It should be understood that the control system architecture allows a user to establish predefined rates of delivery for the pre-mixed powder, pre-mixed liquid mixture, and the water delivered by water delivery unit 18 to define the ratios of each that are delivered to the mixer 22. These parameters are defined at step 100 where a cycle of operation of the apparatus 10 is pre-defined with the various operating parameters and batching ratios being pre-defined. The parameters are set at a user interface 210 on the control panel 12 shown in FIG. 8. The user interface 210 is a touchscreen user interface, illustratively embodied as an Allen Bradley® Panelview Plus 600, available from Rockwell Automation, 1201 South Second St., Milwaukee, Wis. The exterior of the control panel also includes a safety lockout 212, an emergency stop 214, and an industrial outlet 216. The controller 92 of the illustrative embodiment is an Allen Bradley® 1769-L24ER-QBIB industrial programmable logic controller, also available from Rockwell Automation, 1201 South Second St., Milwaukee, Wis. The controller 92 operates an Ethernet® bus 218 which provides the communication between the various components of the control system as shown in FIG. 20. At a first step 102, the apparatus is initialized for operation by loading a pre-mixed powder into a bin 40 of the bulk powder delivery unit 16. The powder is positioned in bin 40 from a platform 226 accessed by a ladder 228, as shown in FIG. 2. At optional step 104, a pre-mixed liquid mixture is loaded into a container 42 of the vaccine delivery assembly 20.

Once a particular cycle of operation is defined by a user the operation of the apparatus 10 is started by the user at step 105. The controller 92 begins operation of the apparatus 10 at step 106 by feeding water to the mixer 22 from a line 44 connected to a typical source of pressurized water, such as a typical water line. In the illustrative embodiment, the water temperature is permitted to vary between fifty degrees Fahrenheit and seventy degrees Fahrenheit. In some embodiments, the water may be heated to a particular temperature to control the rate of dissolution of the pre-mixed powder. Referring to FIGS. 11-12, the amount of water delivered is controlled by opening and closing a valve 46 operated by the controller 92. The flow of water is measured by a flowmeter 48. Once sufficient water has been delivered to the mixer 22, the valve 46 is closed. The valve 46 is a solenoid valve actuated and operated by the controller 92 as shown diagrammatically in FIG. 20.

Figure 9:
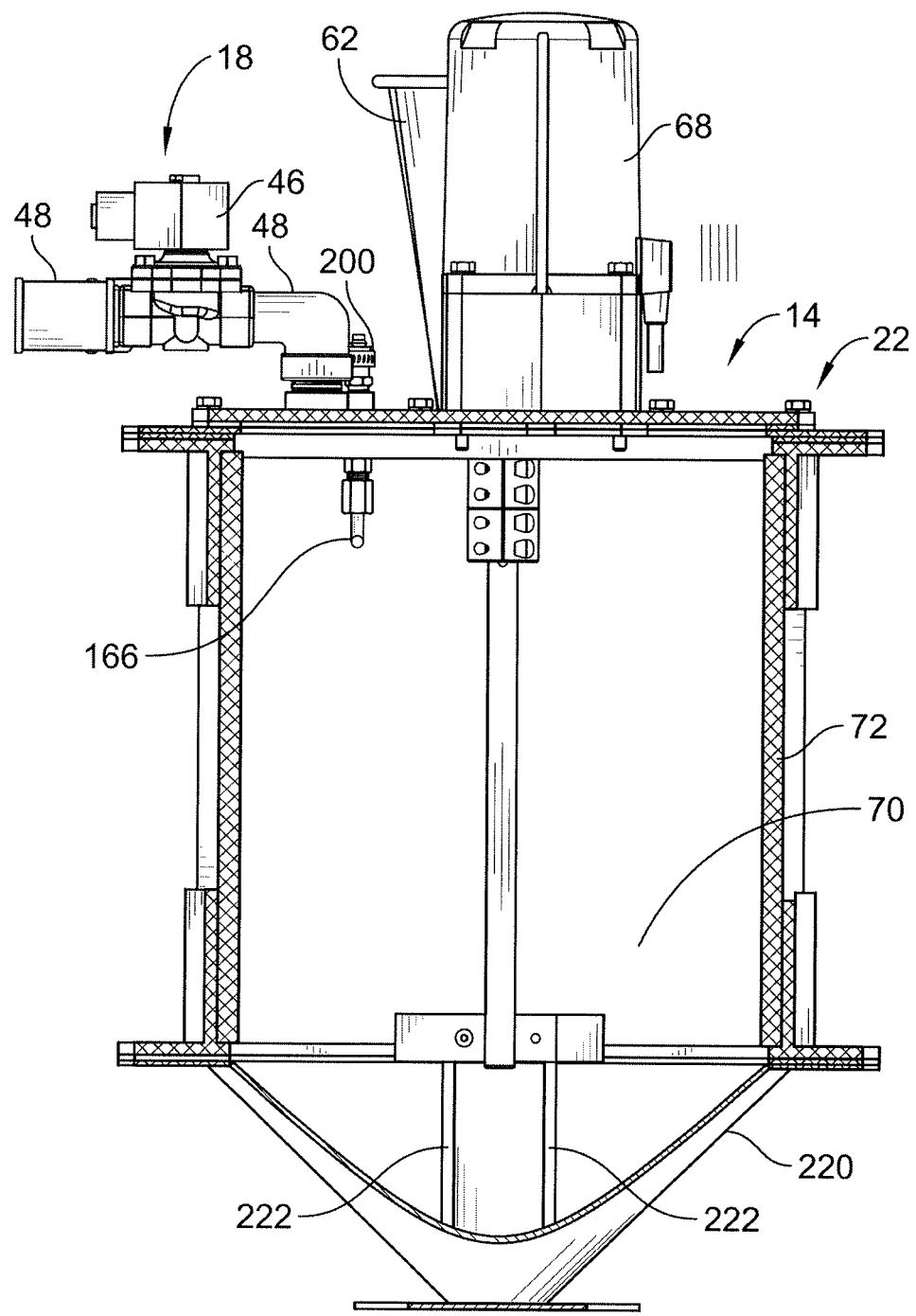
FIG. 9 is a cross-sectional view of a mixer of the apparatus of FIG. 1.
Figure 16:
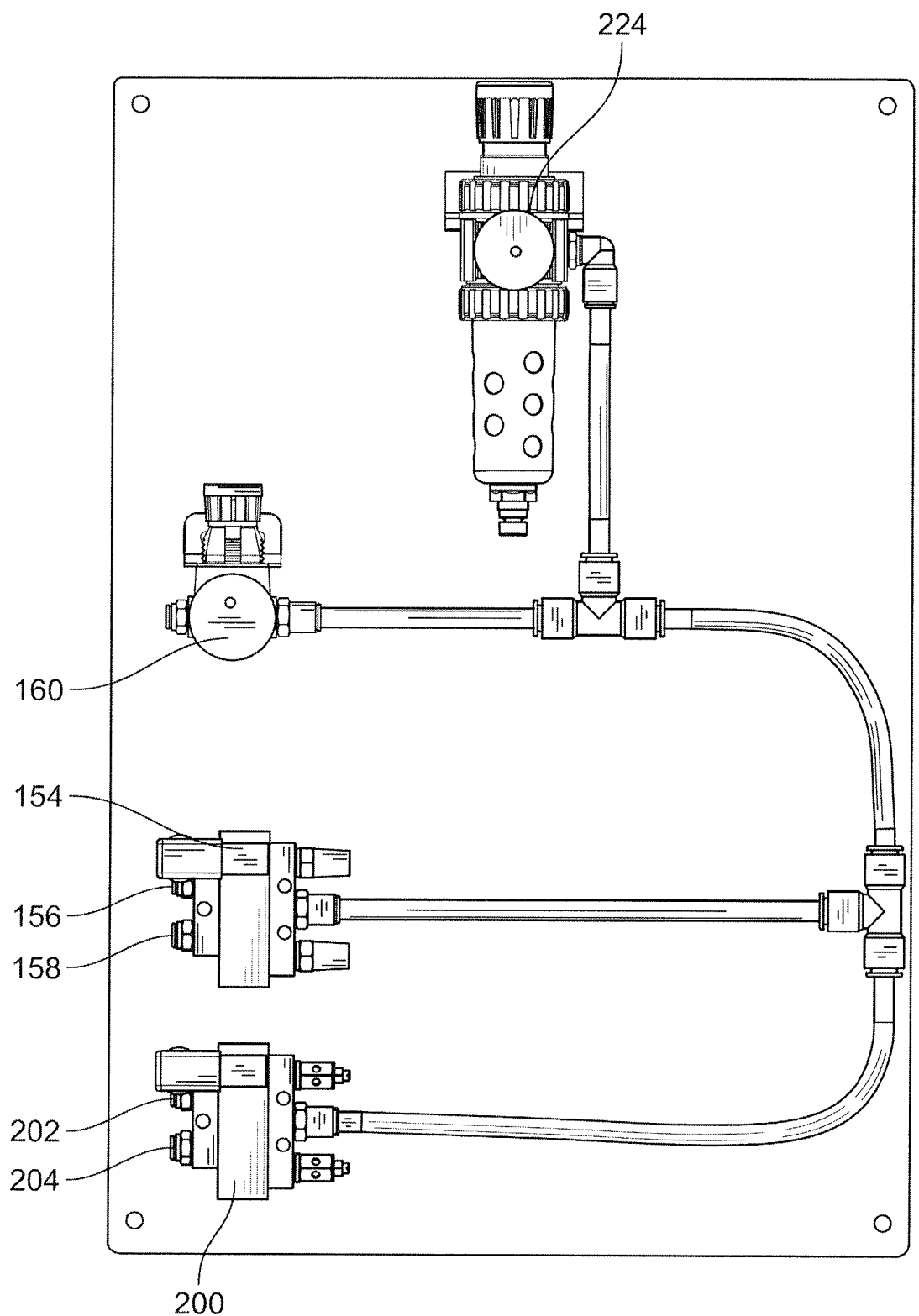
FIG. 16 is a front plan view of a pneumatic regulation assembly of the apparatus of FIG. 1.

When needed, the flow of pre-mixed liquid from the vaccine delivery assembly 20 is metered into the mixer 22 of the mixer assembly 14 by a flow assembly 50 at optional step 107. The flow assembly 50 includes a bubble feeder which is connected to a pneumatic regulator assembly 160 (shown in FIG. 16) which is operable to selectively provide a regulated flow of air to the flow assembly 50. The pneumatic regulator assembly 160 is pneumatically connected to a primary regulator 224 which receives plant air and regulates it down to an appropriate level for the operation of the apparatus 10. Referring to FIG. 15, the flow assembly 50 includes an inlet 162 coupled to the pneumatic regulator assembly 160 by a conduit and an outlet 164 which is coupled to a peristaltic pump 198 which meters the flow through a conduit (not shown) to a check valve 208 positioned above the mixer 22 as shown in FIG. 9. The valve 208 permits a flow of fluid into the mixer 22 through a conduit 166, but prevents a back flow of fluid into the vaccine delivery assembly 20. In some embodiments, the vaccine delivery assembly 20 may include an optional flowmeter 52 shown in FIG. 20 to measure the flow of liquid from the vaccine delivery assembly 20 to the mixer 22. In addition, the container 42 is supported on a load cell 54 that monitors the amount of pre-mixed liquid to confirm that the ratio is correctly delivered into the mixer. The amount of pre-mixed water delivered is dependent on the ration of mix in the container 42 and the total ratio of mix to the batch.

As soon as the liquid is delivered to the mixer 22, the process proceeds to step 108 where the controller 92 initiates the operation of a motor 68 which rotates a paddle assembly 70 positioned in a housing 72 of the mixer 22. The speed of the motor 68 and duration of operation is closely controlled by the controller 92 so that the mixture of powder and liquid is worked appropriately to achieve an acceptable consistency of the digestible product. As will be discussed in further detail below, the consistency of the digestible product is important to achieve the proper characteristics of a shot 250 (See FIG. 18) delivered to the container 30.

The paddle assembly 70, shown in FIGS. 9 and 10, extends into a lower conically shaped pan 220 of the mixer assembly 14. The paddles 222 of the paddle assembly 70 are configured to cooperate with the conically shaped pan 220 to cause the material in the housing 72 of the mixer 22 to form a vortex during rotation of the paddle assembly 70 to cause effective mixing of the materials in the mixer 22 in a relatively short duration of time. In the illustrative embodiment, the mixture is complete in about forty-five seconds to one minute.

Once the liquid is delivered to the mixer 22 and the motor 68 starts, the controller 92 initiates the delivery of pre-mixed powder by operation of powder feeder 56 of the bulk powder delivery unit 16 at process step 110. The powder feeder 56 includes a motor 58 and an auger 60 driven by the motor 58 which moves powder from the bin 40 to a delivery chute 62 where the powder falls into the mixer 22. The operation of the motor 58 is controlled by the controller 92. The delivery of powder is controlled by a valve 64 which opens and closes. The valve 64 includes a double-acting actuator with a first line 156 from the pneumatic control assembly 154 moving the valve 46 to an open position and a second line 158 moving the valve 46 to a closed position to control the amount of powder moved in a batch. The bin 40 is supported on a scale system 66 which provides a signal used by the controller 92 to confirm that the rate of delivery of powder is correct.

The scale system 66 includes a first load beam assembly 168 (best seen in FIG. 2) and a second load beam assembly 170 (best seen in FIG. 1). The first load beam assembly 168 is shown in FIG. 13 and includes a frame 172 with flanges 174 and 176 which mount to the frame 152 by fasteners. The bin 40 of the bulk powder delivery unit 16 is supported on supports 180 and 182 of respective load beams 184 and 186. A junction box 188 provides electrical connections between the load beams 184 and 186 and the controller 92. Similarly, the second load beam assembly 170 includes a frame 172 with the flanges 174 and 176 for mounting to the frame 152 by fasteners. The bin 40 is supported on a load beam 190 at a mount 196. The signal from the load beam 190 is combined with the signal from the load beams 184 and 186 to provide a signal indicative of the weight supported by the scale system 66. This weight signal is used by the controller 92 to control the flow from the bin 40 through the powder feeder 56 to the mixer 22.

Upon completion of the mixing at process step 110, the entirety of digestible product in the mixer 22 is transferred to a hopper 74 of the dispensing unit 26 by the transfer assembly 24 at step 112. To transfer the digestible product, the controller 92 causes a pneumatic control assembly 200 to open a valve 78 which allows the material to exit the bottom of the housing 72 of the mixer 22. The valve 78 includes a double-acting actuator with a first line 202 from the pneumatic control assembly 200 moving the valve 78 to an open position and a second line 204 moving the valve 78 to a closed position. When the valve 78 is open, the digestible product enters a pump 80 which is driven by a motor 82. The controller 92 causes the motor 82 to operate the pump to push the material through a conduit 84 into the hopper 74. Once the material is transferred, the motor 82 stops and the controller 92 closes the valve 78 under the control of the pneumatic control assembly 206.

As will be described in further detail, the controller 92 monitors the number of shots of digestible product delivered by the dispensing unit 26 to determine when the amount of material in the hopper 74 drops below a pre-defined level. At decision step 114, the controller 92 evaluates whether a new batch of digestible material is needed. The controller 92 includes a processor 230 and a memory device 232 which stores the instructions operated upon by the processor 230 to control the operation of the apparatus 10. The status of material is monitored by storing the operating history in the memory device 232 and reviewing that information to determine the amount of material produced and the amount of material dispensed. An additional batch of material is indicated if the amount of material positioned in the hopper 74, as measured by the controller 92, is insufficient to complete the pre-determined cycle established at step 104. If it is insufficient, the controller 92 returns to step 106 and proceeds to initiate the preparation of another batch. It should be understood that the batching process of steps 106 to 112 may be repeated multiple times in a single cycle, meaning multiple batches may be needed to complete a cycle. It should also be understood that a batch cycle 126, which includes steps 106 to 112, may be operated independently and in parallel to the remaining steps discussed below.

At decision step 116, the controller 92 operates the optical sensor 38 to continuously monitor for the presence of a container 30 in the dwell zone 34. If the presence of a container 30 is detected, the controller 92 initiates the dwell clamp 36 at step 118 to secure the container 30. Once the container 30 is secured, a dispenser 86 of the dispensing unit 26 is operated by the controller 92 to cause a nutrient shot 250 to be dispensed into the container 30 of hatchlings at 120. In the illustrative embodiment, a nutrient shot 250 is approximately one hundred grams. It has been determined empirically that for a container 30 containing 100 chicks, a nutrient shot 250 should be delivered centrally into the container 30 at a diameter of about four inches and a height of about one to one and one-half inches. This size and location permits all of the chicks to access the nutrient shot 250 in a timely fashion during the transport cycle from the hatchery to the growing facility. The controller 92 operates to form the digestible material such that the material is delivered with the appropriate characteristics to form the nutrient shot 250 in the desired dimensions. In some embodiments, the nutrient shot 250 may have different dimensions, depending on the age of the chicks, the environmental conditions, the size of the container 30, or other variables which may cause the effectiveness of the size of the nutrient shot 250 to vary.

At step 122, which commences upon the dispenser 86 being cycled and a minimal delay time to allow the nutrient shot 250 to drop to the container 30, the clamp 36 is released and the container 30 is allowed to advance to a transfer conveyor 90 which conducts the container 30 to further processing in the facility. The process proceeds to decision step 124 to determine whether the pre-determined cycle defined at step 106 has been completed. If it has, then the process terminates at step 130. If the pre-determined cycle is not complete, the process returns to the decision step 116 to monitor for another container 30. It should be understood that the dispense cycle 128 may operate continuously and independently of the batch cycle 126 until the pre-determined cycle is completed. If so, the process ends at step 130.

Figure 18:
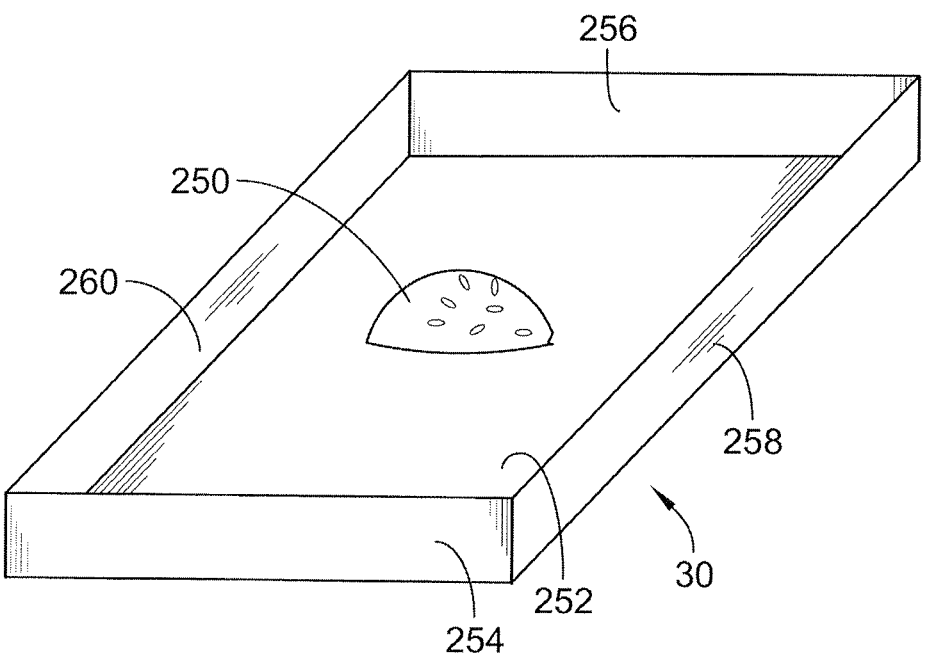
FIG. 18 is a perspective view of a chick box with a nutrient shot present in the box.
Figure 19:
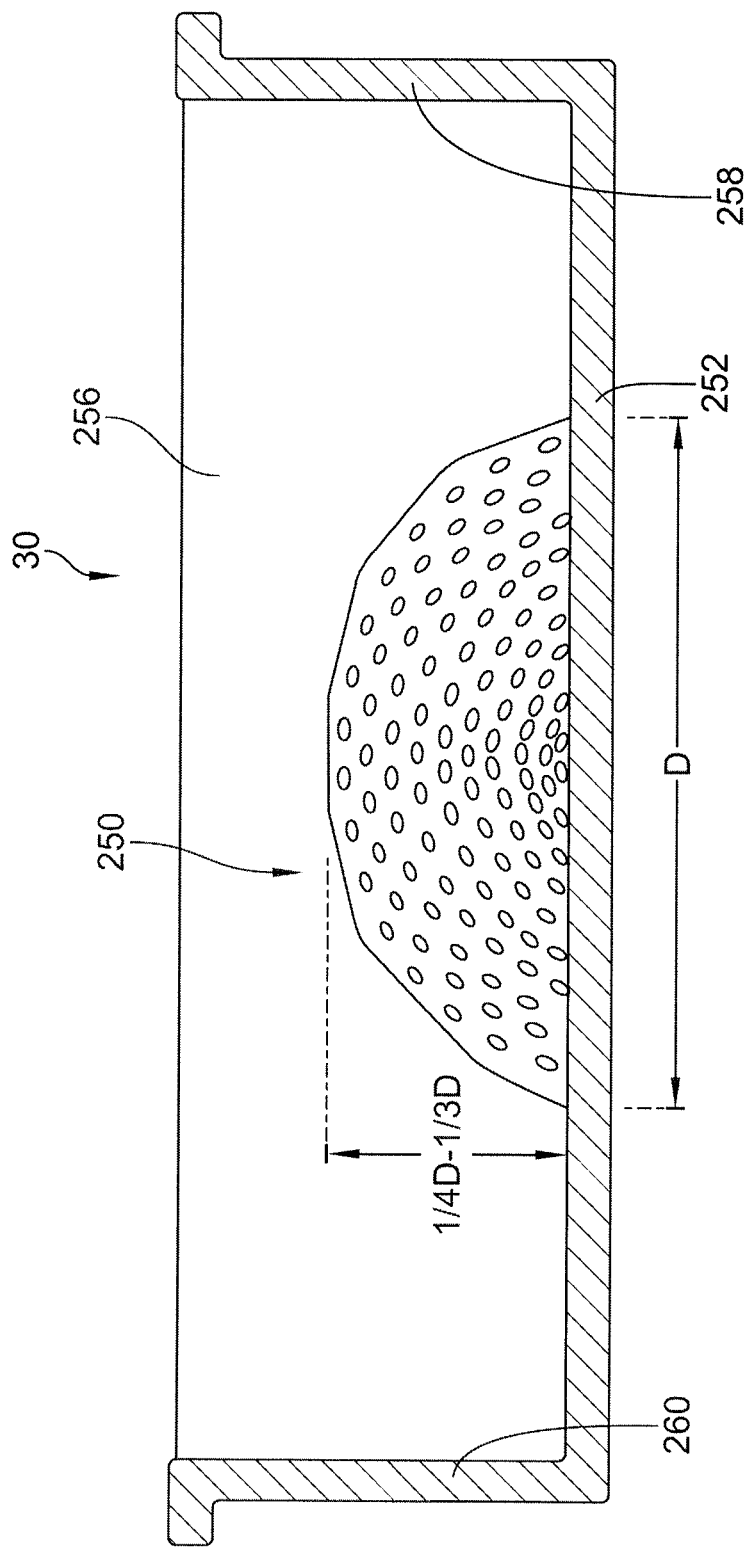
FIG. 19 is a diagrammatic side view of a nutrient shot positioned in a solid bottom container.

Referring now to FIGS. 18 and 19, a container 30 is shown with a nutrient shot 250 positioned on a solid bottom 252 of the container 30. The solid bottom 252 in the container varies from prior art systems which use a perforated bottom with a removable paper. In the present embodiment, the solid bottom 252 prevents inadvertent loss of the ingestible product. The container 30 further includes end walls 254 and 256 and sidewalls 258 and 260, with the walls 254, 265, 258, and 260 form a perimeter barrier to contain the chicks during processing and transport. As shown in FIG. 19, the shot 250 forms a generally hemispherical pile accessible to multiple chicks. It has been found that a pile having a height that is about one-fourth to one-third of the diameter of the pile is very effective for successfully feeding the chick in a container configured like container 30 or container 270 discussed below. Thus, it is important to maintain the ratio of water to other constituents to achieve the appropriate proportions so that the material maintains a generally tight pile and does not spread throughout the container. This reduces the risk of unconsumed material from becoming contaminating by excrement from the chicks in the container.

Figure 34:
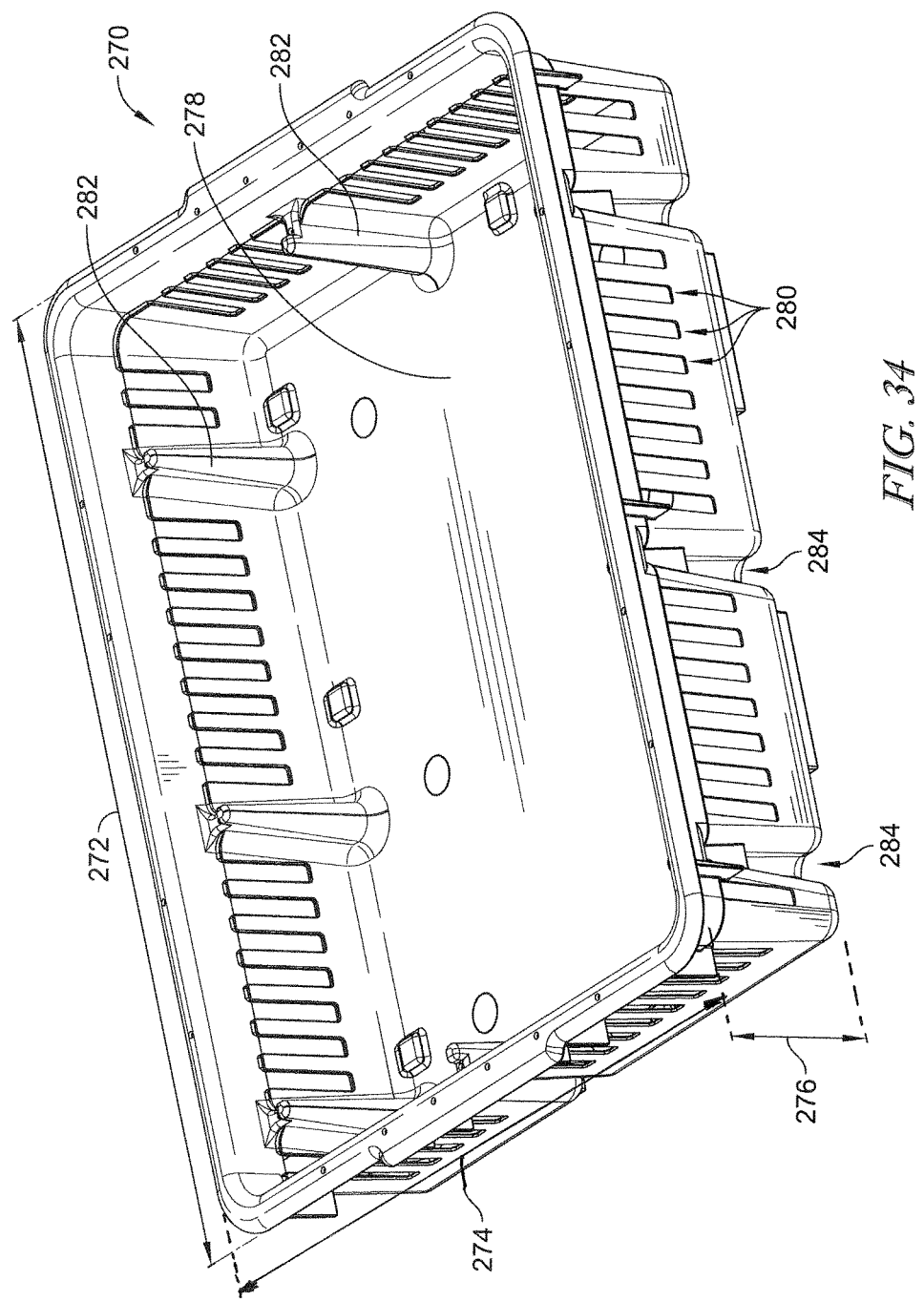
FIG. 34 is a perspective view of an embodiment of a chick box having a solid bottom.

Another embodiment of a hatchling container/chick box 270, similar to the container/chick box 30, is shown in FIG. 34. Notably, the container 270 is optimized for use with the apparatus 10 and an apparatus 310 discussed below. The container 270 has a length 272 of about 23 inches, a width 274 of about 20 inches, and a depth 276 of about 5.5 inches. The container 270 has a solid bottom 278 and several stiffeners 282 positioned about the walls of the container 270. The walls of the container 270 are formed to include vents 280 and receivers 284. The receivers 284 are configured to be engaged with the stiffeners 282 of other containers 270 such that when multiple containers 270 are stacked, the stiffeners 282 engage the receivers 284 to allow the multiple containers 270 to be securely stacked. The containers 30 and 270 can be distinguished from prior art containers that included perforated bottoms. In practice, the perforated bottoms are used with paper laid over the perforations. The paper allows for excrement and excess feed or other by-products to be gathered when the container has been emptied. The perforations allow liquids to pass through paper and through the container. In the present embodiments, it has been found that the paperless solid bottom improves the performance of the chicks in consuming the nutrient shot 250.

Figure 21:
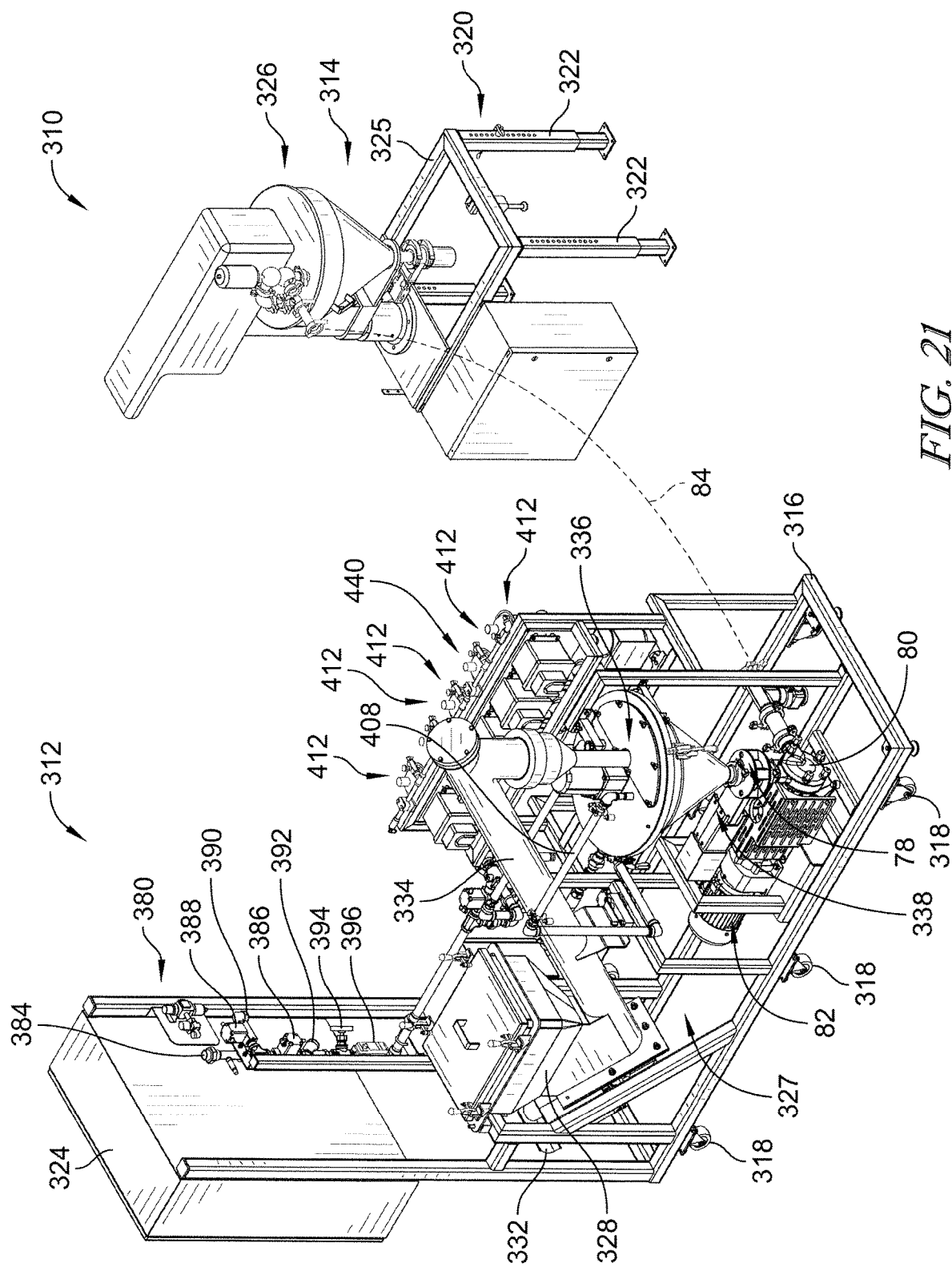
FIG. 21 is a perspective view of another embodiment of an apparatus for automatically delivering a digestible nutrient shot to a container of recently hatched fowl, the view of FIG. 21 taken with a batching unit control panel positioned on the left side of the view of FIG. 21 and a delivery unit positioned on a right side of the view of FIG. 21.
Figures 30, 31:
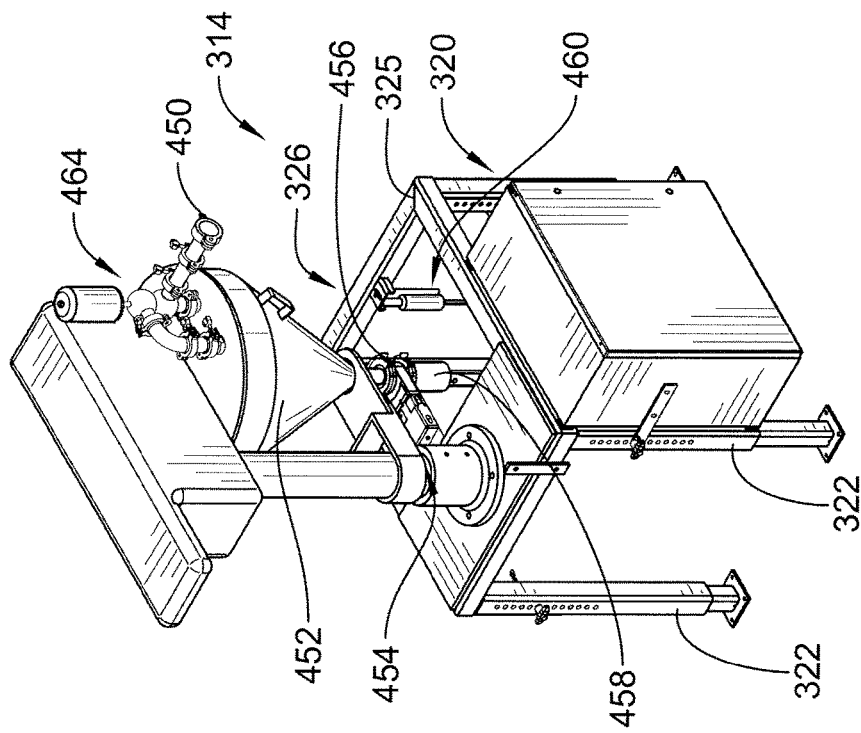
FIG. 30 is a front plan view of the batching unit of FIG. 21.
FIG. 31 is a perspective view of the delivery unit of FIG. 21.

The apparatus 10 discussed above is configured as a turn-key delivery unit on a single frame 152. In another embodiment, shown in FIG. 21, an apparatus 310 includes a batching unit 312 and a dispensing unit 314. The batching unit 312 includes a frame 316 which is supported on several casters 318 that allow the batching unit 312 to be easily moved to change the position of the batching unit 312 in the hatchery. Referring to FIGS. 29 and 30, the batching unit 312 also includes a number of levelers 319 which are used to level the batching unit 312 when it is positioned in the hatchery. The dispensing unit 314 includes a frame 320 that is configured to be fixed to a floor in the hatchery at a location that engages the conveyor 32. The frame 320 has legs 322 which are adjustable to vary the height of a platform 325 relative to the floor so that a dispensing unit 326 may be properly positioned relative to the conveyor 32.

The batching unit 312 includes a control panel 324 which is similar to the control panel 12 described above. A bulk powder delivery unit 327 is positioned on the frame 316 so that user is able to access a bin 328 from the floor without climbing the ladder 228 of the embodiment of FIG. 1. A powder feeder 330 includes a motor 332 that drives an auger 334 which feeds a powder chute 336 to direct powder being fed to a mixer 338.

Figure 22:
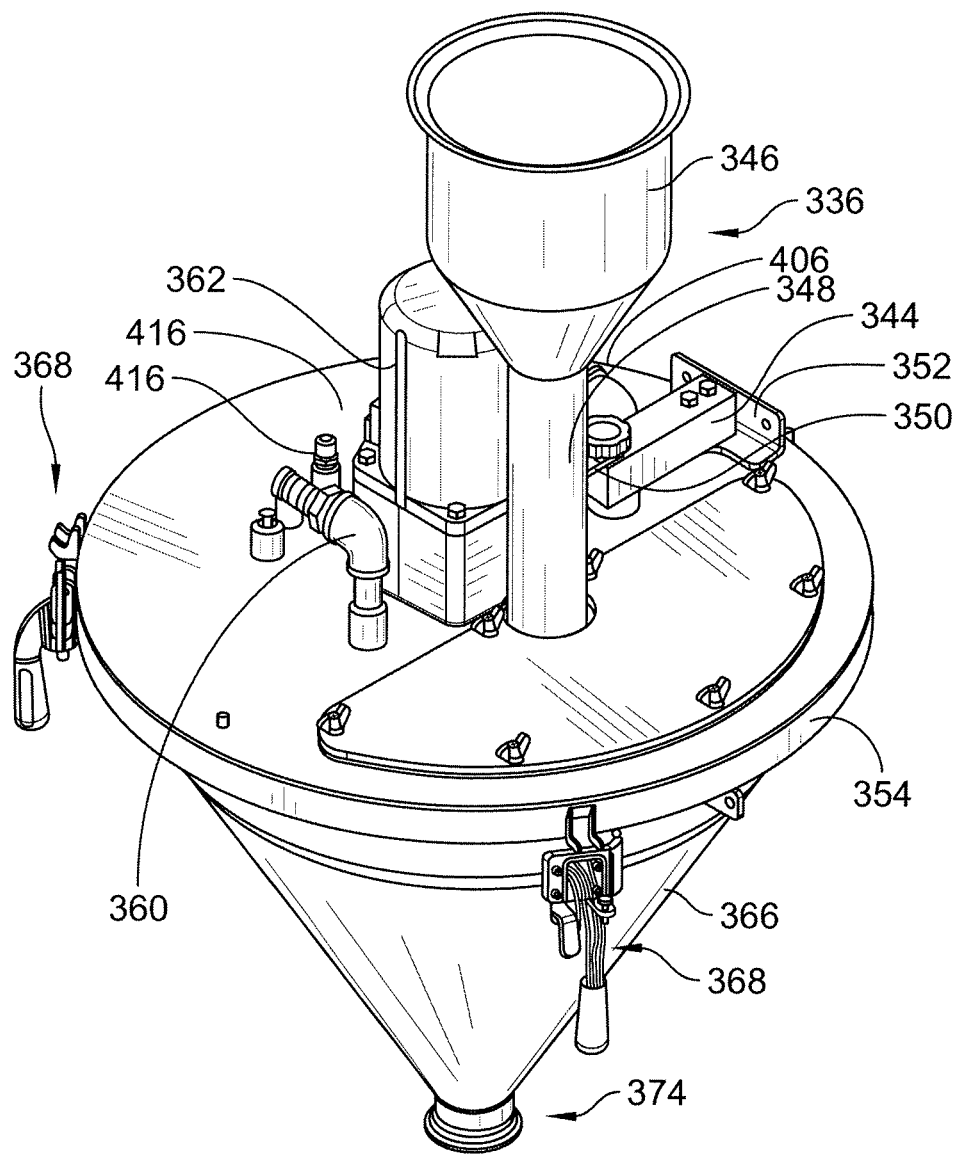
FIG. 22 is a perspective view of a portion of the batching unit of FIG. 21.
Figure 24:
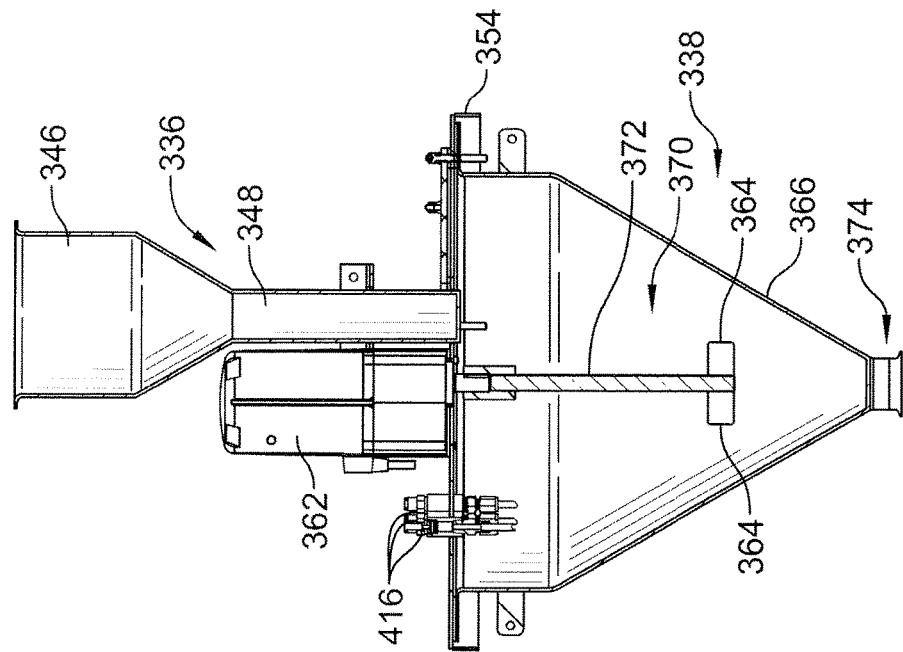
FIG. 24 is a cross-sectional view of the portion of the batching unit shown in FIG. 23, the cross section taken along lines 24-24.
Figure 23:
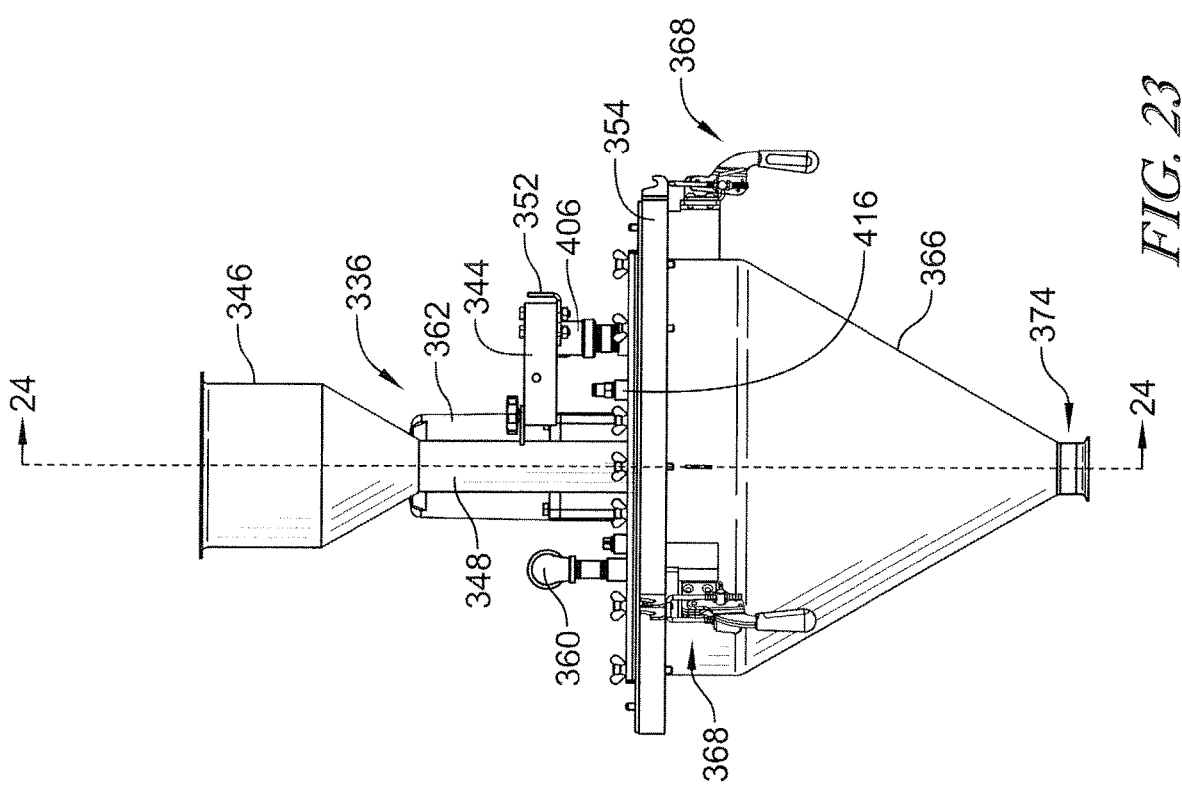
FIG. 23 is a front plan view of the portion of the batching unit shown in FIG. 22.
Figure 25:
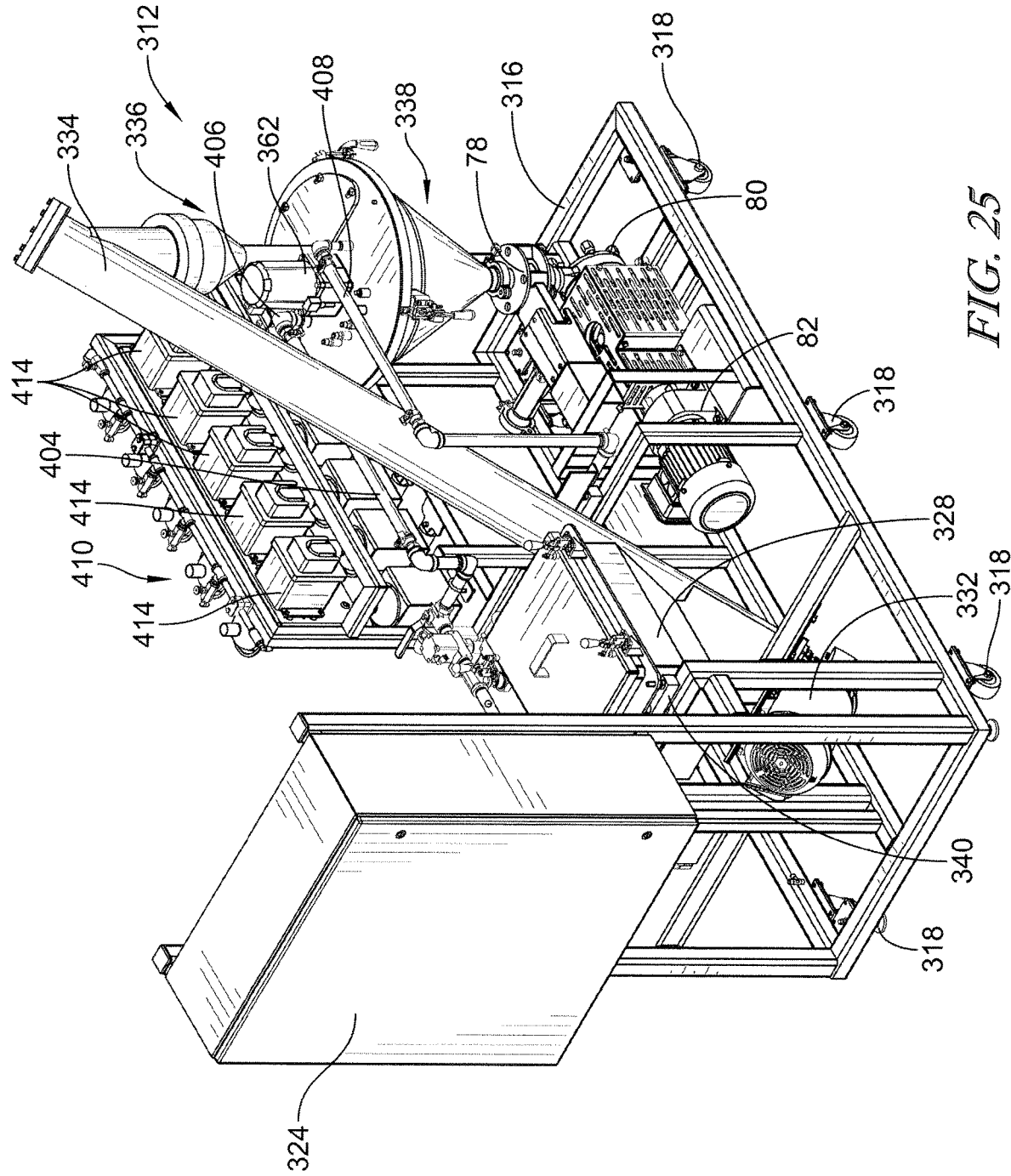
FIG. 25 is a perspective view of the batching unit of FIG. 21 taken from a different perspective from FIG. 21.

Referring now to FIGS. 22-24, the details of the interface between the powder feeder 330 and the mixer 338 is disclosed in further detail. The powder chute 336 includes the housing 346 and a drop tube 348. A bracket 350 is secured to the drop tube 348 and is engaged by a beam 344 so that the housing 346 and drop tube 348 are freely supported on the beam 344 in a cantilevered fashion. The beam 344 is supported from a bracket 352 which is secured to a lid 354 of the mixer 338 so that all of the load of the housing 346 and drop tube 348 passes through the beam 344. In this way, the beam 344 supports the weight of the drop tube 348, the housing 346, and any powder that is dropped into the housing 346. The powder chute 336 is supported so that the drop tube 348 does not contact the mixer 338. In some embodiments, the beam 344 is a load cell that is used to monitor the weight of powder being dispensed into the mixer 338. When the beam 344 is configured as a load cell, a knife gate may be positioned in the drop tube 348 to selectively hold powder in the drop tube 348 to allow it to be weighed before being delivered to the mixer 338. In the presently disclosed embodiment of the batching unit 312, the amount of powder fed to the mixer 338 is measured by a pair of load cells 340, 340 which are coupled to the frame 316 and support the load of the powder feeder 330. The mounting of load cells 340 is similar to the arrangement of the load beams 184, 186, and 190 discussed above. As the powder feeder 330 moves powder to the chute 336, the weight measured by the load cells 340, 340 changes with the signal being fed to the controller 92. The controller controls the operation of the motor 332 which drives a feeder screw 441 (see FIG. 29) of the auger 334. Once the appropriate amount of powder is transferred, the controller 92 stops the motor 332 to thereby stop the flow of powder to the mixer 338. In some embodiments, the mixer 338 may also be supported on a load cell or scale assembly to monitor the amount of material fed to the mixer 338 and to monitor the amount of material in the mixer 338 to determine whether a new batch should be mixed.

The mixer 338 includes a water inlet 360 that receives water as will be discussed in further detail below. A motor 362 is operable to move a paddle 370 (seen in FIG. 24) to mix the powder and water inside of the mixer 338. Referring again to FIG. 22, the mixer 338 includes the lid 354 which supports the powder chute 336, water inlet 360, and motor 362. The lid 354 is supported on a conically shaped hopper 366 as shown in FIGS. 23-24. The lid 354 is secured to the hopper 366 by a number of clamps 368. The lid 354 is removable to ease the periodic cleaning of the interior of the hopper 366.

As shown in FIG. 24, the paddle 370 includes a shaft 372 and a pair of blades 364, 364 that extend from the shaft 372. The rectangular shape of the blades 364, 364, along with the positioning of the blades 364, 364, within the hopper 366 cooperates to provide an efficient and effective arrangement for mixing the powder and water into a gel with the characteristics to be delivered as a nutrient shot 250 as described above. The speed of the rotation of the paddle 370 can be varied by varying the speed of the motor 362 to adjust the agitation of material in the hopper 366 depending on variations in the constituents of a particular batch of material being processed. After being mixed, the gel material formed in the hopper 366 exits the mixer 338 through an outlet 374 and into the valve 78 that feeds the material into the pump 80 driven by the motor 82 as discussed with regard to the apparatus 10. The pump 80 moves the gel through a conduit 84 (shown in dotted lines in FIG. 21) to the dispensing unit 314 in the same way that material is moved through the conduit 84 discussed above.

While the apparatus 310 has some variations as compared to the apparatus 10, the control structure is similar to the apparatus 310 and the discussion of the specific pneumatic and control components are not discussed in detail, but similar components are referenced with the same reference numerals as discussed relative to apparatus 10.

The control panel 324 is configured similarly to the control panel 12 discussed above and includes the controller 92, user interface 210, and emergency stop 214 as discussed above. The controller 92 includes the processor 230 and memory device 232 discussed above so that the controller 92 can control batch cycles in the batching unit 312 and delivery cycles in the dispensing unit 314 to automatically batch and deliver gel material over multiple batch cycles and several hours of delivery cycling through the dispensing unit 314.

Figure 26:
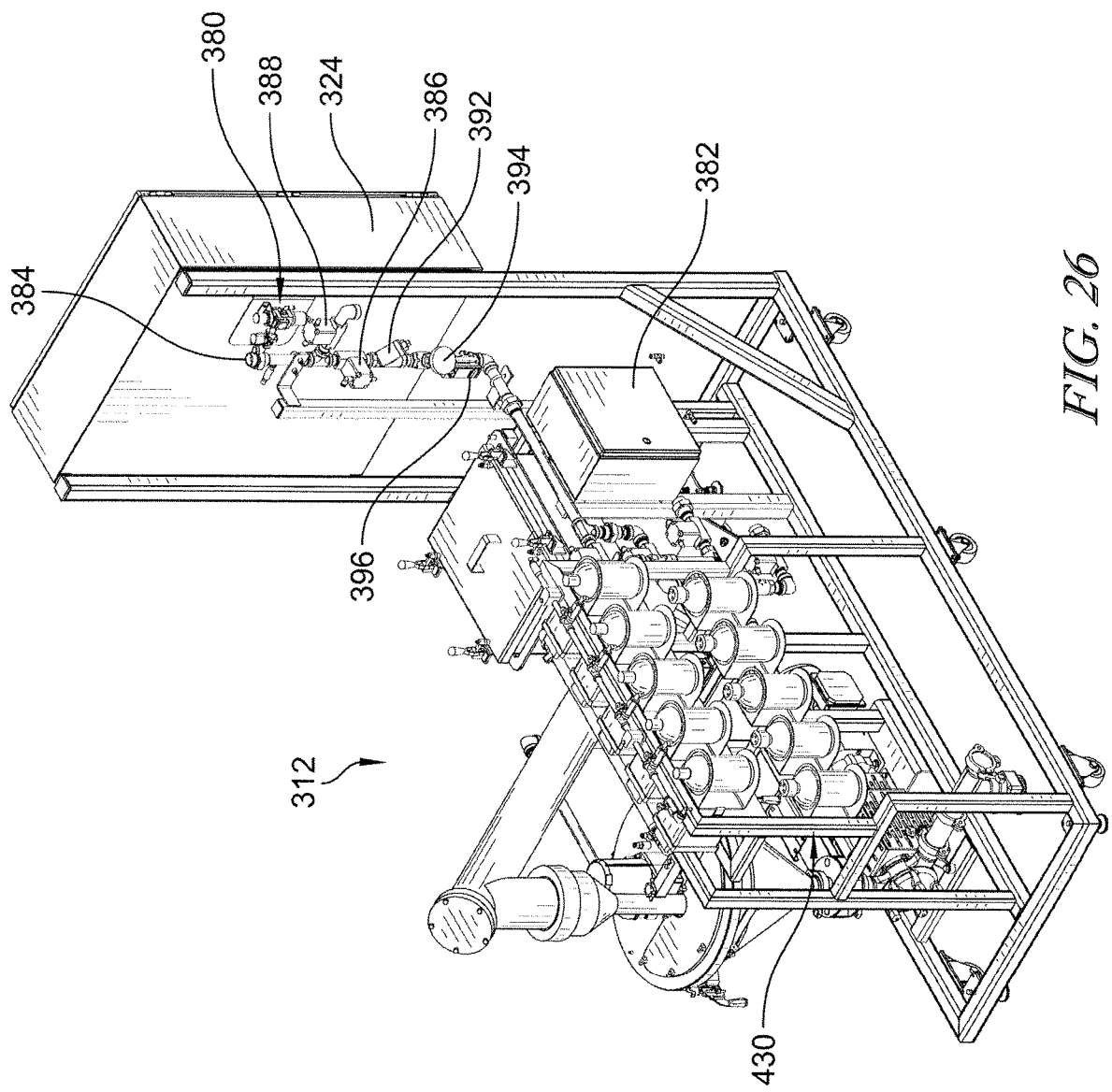
FIG. 26 is another perspective view of the batching unit of FIG. 21.

Further details of the batching unit 312 are shown in FIGS. 25-30. Plant air is provided to an air regulator assembly 380 as shown in FIG. 26. The regulator assembly 380 conditions and regulates the air delivered to the various pneumatically driven and controlled components in the batching unit 312. The pneumatics are controlled by a pneumatic control assembly enclosed in a housing 382.

Supply water is provided through a water supply inlet 384. A pneumatically controlled water shut-off valve 386 controls the flow of water to the system. An additional pneumatically controlled water shut-off valve 388 allows water to be by-passed from the system and out an outlet 390.

The flow to outlet 390 may allow for the supply water to be cleared from the system or allow water to be accessed from the outlet 390 for cleaning of the apparatus 310. The water is also processed by a strainer 392 and then further controlled by a manual flow control valve 394. The flow is measured by a flow sensor 396 that provides a signal to the controller 92. In some embodiments, the water supply to either the apparatus 10 or apparatus 310 may include a thermostatically controlled mixing valve to control the temperature of the water fed to the 384 using a separate cold and hot water supplies to regulate the temperature. It has been found that temperatures of between 50 degrees Fahrenheit and 70 degrees Fahrenheit provide the best result for mixing materials to form the nutrient shot 250. An example of an appropriate mixing valve is a Guardian G3700LF Series thermostatic mixing valve from Guardian equipment of Chicago, Ill.

For cleaning the system, a sanitizer inlet 396 is provided to allow a sanitizer material to be introduced into the system through a valve 398. Additionally, a detergent inlet 400 provides a position for delivering detergent into the system through a valve 402. When being used, the cleaning materials are fed through a conduit 404 into an inlet 406 positioned on the lid 354 of the mixer 338. This allows the mixer 338 to be easily cleaned. The main water supply is fed through a conduit 408 into the inlet 360 on the lid 354 for mixing the gel in the mixer 338.

The batching unit 312 also includes a vaccine delivery assembly 410 which is configured to delivery multiple vaccines to the mixer 338 to be included in the nutrient shot 250. The vaccine delivery system includes five vaccine vials 412, each with a corresponding peristaltic pump 414 that meters the flow of vaccine to respective check valves 416 positioned in the lid 354 of the mixer 338. Referring to FIGS. 27 and 28, each vial 412 is supported on a bracket 420. Each bracket 420 is supported on a load cell 422, each of which is supported on the frame 316 and each of which provides a signal to the controller 92 which monitors and controls the flow of vaccine to the mixer 338 by varying the operation of the respective peristaltic pump 414 to vary the flow of vaccine. It should be understood that while the vials 412 are referred to "vaccine" vials, other materials including nutrients or additives may be metered to the mixer 338 through the vials 412 by the operation of the peristaltic pumps 414. Referring to FIG. 26, the batching unit 312 also includes a rack 430 for storing additional vials 412 to be used as replacements when a particular vial 412 that is being used to feed the mixer 338 is emptied.

Once the materials are mixed in the mixer 338, the pump 80 transfers the material through the conduit 84 to an inlet 450 of the dispensing unit 314. The inlet 450 feeds a hopper 452 of the dispensing unit 314. The dispensing unit 314 includes, illustratively, a Model B-350E vertical dispenser available from All Fill, Inc., 418 Creamery Way, Exton, Pa. 19341. The apparatus 310 is arranged so that the dispensing unit 314 operates under the control of the controller 92. Unlike the embodiment of apparatus 10, the dispensing unit 314 also includes a pneumatically actuated shut-off gate 454 that controls the delivery of the shot 250. The shut-off gate 454 is connected to an outlet 456 of the hopper 452 and drops the shot 250 through a guard 458. As described above with regard to the dispensing unit 26, the dispensing unit 314 senses the presence of a box 30 using a sensor, such as an optical sensor. The controller 92 then actuates a pneumatically operated stop 460 to stop the movement of the box 30 while the dispensing unit 314 cycles to deliver a shot 250. The number of shots 250 delivered is monitored by the controller 92, as discussed above with regard to apparatus 10, and the controller 92 follows the algorithm of FIG. 6, with pneumatic stop 460 functioning in place of the clamp block 96.

The hopper 452 is modified to include a vent 462 which allows air to escape from the hopper 452 when gel material is fed into the hopper 452. It has been found that this vent 462 improves the consistency of the gel material during delivery and reduces the opportunity for air pockets to be formed in the gel, thereby causing inconsistencies in the amount of material included in a particular shot 250.

Figure 33:
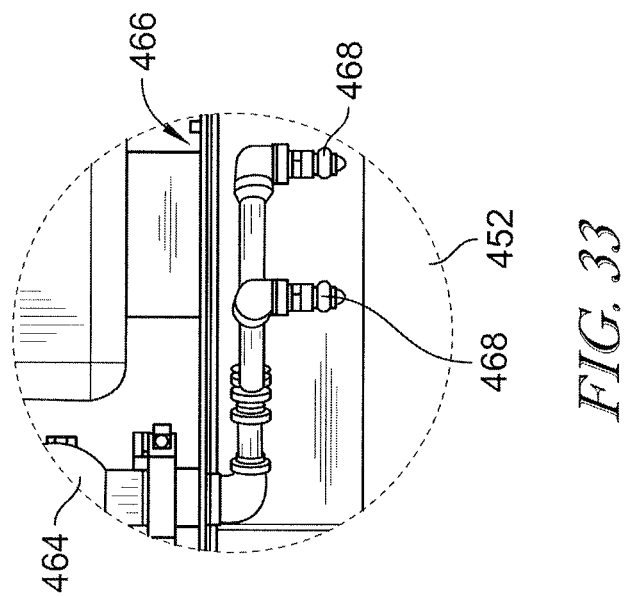
FIG. 33 is a partial cross-sectional view of a portion of the delivery unit of FIG. 21.
Figure 32:
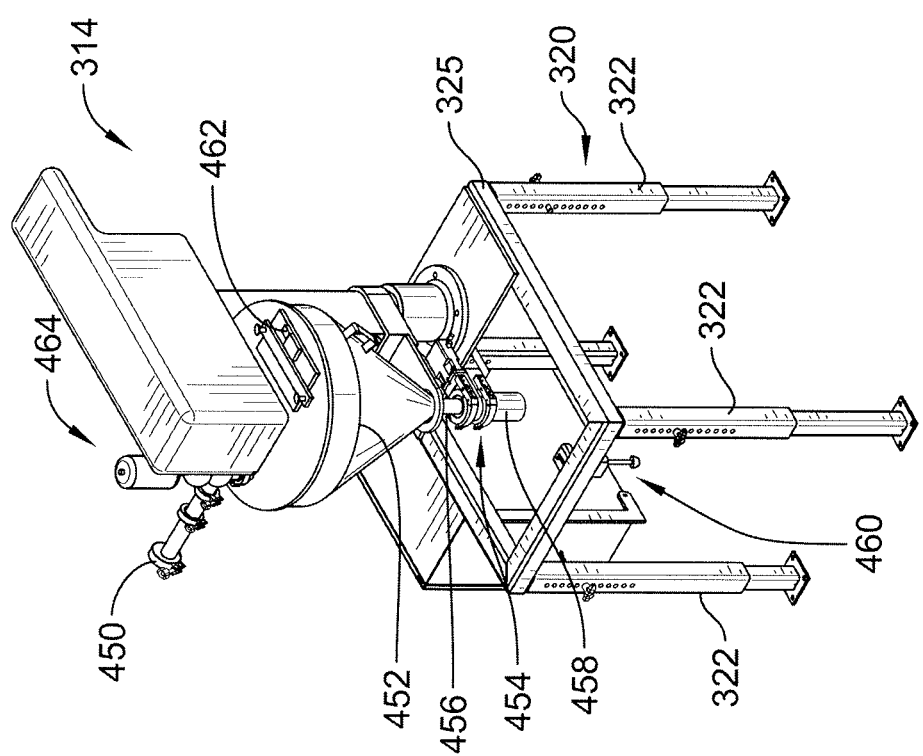
FIG. 32 is another perspective view of the delivery unit of FIG. 21.

The dispensing unit 314 also includes a diverter valve 464 positioned at the inlet 450. The diverter valve 464 will direct the flow of material from conduit 84 to a cleaning assembly 466 (shown in FIG. 33) that delivers a flow of water, possibly including sanitizer and/or detergent, into the hopper 452. The cleaning assembly 466 includes nozzles 468, 468 that have multiple orifices and discharge the flow of water and other cleaning material in multiple directions and at an increased discharge velocity to assist with cleaning the interior of the hopper 452.

Although this disclosure refers to specific embodiments, it will be understood by those skilled in the art that various changes in form and detail may be made without departing from the subject matter set forth in the accompanying claims.

The invention claimed is:

1. An apparatus for delivering digestible products to hatchling fowl, the apparatus comprising
   a controller,
   a receiving portion for receiving a container of hatchling fowl,
   a sensor electrically coupled to the controller and operable to detect that the container is within the receiving portion, and
   a metered delivery mechanism, the metered delivery mechanism electrically coupled to the controller and configured to deliver a pre-defined quantity of digestible product to the container,
   wherein the controller includes a processor and a memory device, the memory device including instructions that, when executed by the processor, cause the processor to monitor the sensor for the presence of a container, and, when a container is present, activate the metered delivery mechanism to deliver the pre-defined quantity of digestible products to the container, and
   wherein the apparatus further includes a grip including an actuator, the grip electrically coupled to the controller and configured to secure the container in a delivery position, wherein the controller is operable to activate the actuator of the grip to secure the container in the delivery position, and, when the container is secured, de-activate the grip when the digestible products have been delivered to thereby allow the container to move out of the receiving portion.

2. The apparatus of claim 1, wherein the controller is operable to monitor the number of containers processed and keep a record of the number of deliveries of pre-defined quantities of digestible products have been delivered.

3. The apparatus of claim 1, wherein the apparatus further comprises a mixer operable to mix a plurality of constituents together to form a digestible product.

4. An apparatus for delivering digestible products to hatchling fowl, the apparatus comprising
   a controller,
   a receiving portion for receiving a container of hatchling fowl,
   a sensor electrically coupled to the controller and operable to detect that the container is within the receiving portion, and
   a metered delivery mechanism, the metered delivery mechanism electrically coupled to the controller and configured to deliver a pre-defined quantity of digestible product to the container,
   wherein the controller includes a processor and a memory device, the memory device including instructions that, when executed by the processor, cause the processor to monitor the sensor for the presence of a container, and, when a container is present, activate the metered delivery mechanism to deliver the pre-defined quantity of digestible products to the container,
   wherein the apparatus further comprises a mixer operable to mix a plurality of constituents together to form a digestible product, and
   wherein the apparatus further comprises a dry material holding bin and a feeder.

5. An apparatus for delivering digestible products to hatchling fowl, the apparatus comprising
   a controller,
   a receiving portion for receiving a container of hatchling fowl,
   a sensor electrically coupled to the controller and operable to detect that the container is within the receiving portion, and
   a metered delivery mechanism, the metered delivery mechanism electrically coupled to the controller and configured to deliver a pre-defined quantity of digestible product to the container,
   wherein the controller includes a processor and a memory device, the memory device including instructions that, when executed by the processor, cause the processor to monitor the sensor for the presence of a container, and, when a container is present, activate the metered delivery mechanism to deliver the pre-defined quantity of digestible products to the container, and
   wherein the memory device includes instructions that, when executed by the processor, cause the apparatus to mix a batch of a digestible products and transfer the batch to a holding bin for feeding the metered delivery device.

6. The apparatus of claim 5, wherein the apparatus includes a mixer under the control of the controller, the mixer operable to vary a speed and duration of a mixing cycle to varying the characteristics of the digestible products.

7. The apparatus of claim 6, wherein the apparatus further includes bulk powder delivery unit operable to deliver a variable amount of bulk powder to the mixer as determined by the controller.

8. The apparatus of claim 7, wherein the apparatus further includes a water delivery unit operable to deliver a variable amount of water the mixer as determined by the controller.

9. The apparatus of claim 8, wherein the apparatus further includes a vaccine delivery assembly operable to deliver a variable amount of a pre-mixed liquid material to the mixer.

10. The apparatus of claim 9, wherein the water delivery unit measures the amount of water delivered using a flow meter and the controller is operable to receive a signal from the flow meter.

11. The apparatus of claim 10, wherein the water delivery unit includes a valve and the controller is operable to cause the valve to open and close to control the flow of water into the mixer.

12. The apparatus of claim 11, wherein the vaccine delivery assembly is operable to deliver a flow of fluid from to the flow of water from the water delivery unit.

13. The apparatus of claim 12, wherein the vaccine delivery assembly includes a valve and the controller is operable to cause the valve to open and close to control the flow of liquid from the vaccine delivery assembly.

14. The apparatus of claim 13, wherein the vaccine delivery assembly includes a load cell coupled to the controller, and wherein the controller is operable to monitor the signal from the load cell to determine the amount of fluid delivered to the mixer.

15. The apparatus of claim 14, wherein the bulk powder delivery unit further includes a scale assembly operable to measure the weight of the bulk powder stored in the bulk powder delivery unit.

16. The apparatus of claim 15, wherein the controller is operable to monitor the weight measured by the scale assembly of the bulk powder delivery unit to control the amount of bulk powder delivered to the mixer.

17. The apparatus of claim 6, wherein the apparatus further includes a water delivery unit operable to deliver a variable amount of water the mixer as determined by the controller.

18. The apparatus of claim 17, wherein the water delivery unit measures the amount of water delivered using a flow meter and the controller is operable to receive a signal from the flow meter.

19. The apparatus of claim 18, wherein the water delivery unit includes a valve and the controller is operable to cause the valve to open and close to control the flow of water into the mixer.

\* \* \* \* \*